US011164476B2

(12) United States Patent
Pittman

(10) Patent No.: US 11,164,476 B2
(45) Date of Patent: Nov. 2, 2021

(54) HEAVY EQUIPMENT SIMULATION SYSTEM AND METHODS OF OPERATING SAME

(71) Applicant: CSE Software Inc., Peoria, IL (US)

(72) Inventor: Andrew Pittman, East Peoria, IL (US)

(73) Assignee: CSE Software Inc., Peoria, IL (US)

( * ) Notice: Subject to any disclaimer, the term of this patent is extended or adjusted under 35 U.S.C. 154(b) by 293 days.

(21) Appl. No.: 16/408,990

(22) Filed: May 10, 2019

(65) Prior Publication Data

US 2019/0371196 A1 Dec. 5, 2019

Related U.S. Application Data

(60) Provisional application No. 62/677,345, filed on May 29, 2018.

(51) Int. Cl.
| | | |
|---|---|---|
| *G09B 9/05* | (2006.01) | |
| *G09B 9/048* | (2006.01) | |
| *H04N 13/279* | (2018.01) | |
| *H04N 13/366* | (2018.01) | |

(52) U.S. Cl.
CPC .............. *G09B 9/05* (2013.01); *G09B 9/048* (2013.01); *H04N 13/279* (2018.05); *H04N 13/366* (2018.05)

(58) Field of Classification Search
None
See application file for complete search history.

(56) References Cited

U.S. PATENT DOCUMENTS

| 6,474,159 B1* | 11/2002 | Foxlin .................... G01C 21/12 73/488 |
|---|---|---|
| 8,957,535 B2 | 2/2015 | Hoellwarth |
| 9,672,757 B2 | 6/2017 | Becker et al. |
| 9,733,480 B2 | 8/2017 | Baek et al. |
| 9,946,073 B2 | 4/2018 | Petrov |
| 2004/0149036 A1* | 8/2004 | Foxlin .................. A61B 5/1113 73/511 |
| 2010/0279255 A1* | 11/2010 | Williams, II ............ G09B 9/14 434/29 |

(Continued)

FOREIGN PATENT DOCUMENTS

WO 2016/210070 A1 12/2016

OTHER PUBLICATIONS

Office Action (CA Application No. 3,043,746; dated May 26, 2020; 4 pages.

(Continued)

*Primary Examiner* — Talha M Nawaz
(74) *Attorney, Agent, or Firm* — Howard & Howard Attorneys PLLC

(57) ABSTRACT

A heavy equipment simulation system for simulating an operation of a heavy equipment vehicle in a virtual environment is described herein. The heavy equipment simulation system includes a support frame, an operator input control assembly coupled to the support frame for receiving input from a user, a motion actuation system coupled to the support frame for adjusting an orientation of the support frame with respect to a ground surface, a display device assembly configure to display the virtual environment including the simulated heavy equipment vehicle, a virtual reality (VR) headset unit adapted to be worn by the user, and a control system.

20 Claims, 23 Drawing Sheets

(56) References Cited

U.S. PATENT DOCUMENTS

| | | | | |
|---|---|---|---|---|
| 2011/0012741 A1* | 1/2011 | Garcia | ................. | G08B 21/22 |
| | | | | 340/666 |
| 2016/0063767 A1 | 3/2016 | Lee et al. | | |
| 2017/0262045 A1 | 9/2017 | Rouvinez et al. | | |
| 2018/0074332 A1 | 3/2018 | Li et al. | | |
| 2018/0096244 A1 | 4/2018 | Mallinson | | |
| 2018/0247557 A1* | 8/2018 | Brice | ................. | G09B 9/04 |
| 2019/0130783 A1* | 5/2019 | Nissen | ................. | G09B 9/24 |

OTHER PUBLICATIONS

How to navigate from a non-VR scene to a VR enabled scene within Android; downloaded on May 9, 2018 from https://answers.unity.com/questions/1335757/how-to-navigate-from-a-non-vr-scene-to-a-vr-enable.html; 3 pages.

Switch between VR display mode and normal display mode; downloaded on May 9, 2018 from https://answers.unrealengine.com/questions/397358/switch-between-vr-display-mode-and-normal-display.html; 2 pages.

The DCS Updater GUI Utility—ED Forums; downloaded on May 9, 2018 from https://forums.eagle.ru/showthread.php?t=160053&highlitht=DCS+Updater+Utility; 9 pages.

How to switch between VR and monitor mode—ED Forums; downloaded on May 9, 2018 at https://forums.eagle.ru/showthread.php?t=174827; 5 pages.

VR—Switch between normal Camera and VR Camera | Unity Forum; downloaded on May 9, 2018 from https://forum.unity.com/threads/switch-between-normal-camera-and-vr-camera.329904/; 3 pages.

Google VR Cardboard: Switch between normal mode and VR mode at run-time; downloaded on May 9, 2018 from http://talesfromtherift.com/googlevr-cardboard-switch-between-normal-mode-and-vr-mode-at-run-time/; 8 pages.

* cited by examiner

CSE Software from SimU Campus
Training Exercise Detail Report (Exam) for ACE VR

Advanced Construction Excavator

| Description ( * Indicates Failure / ** Indicates Critical Failure ) | Results(avg) | Units |
|---|---|---|
| Trenching And Pipe Installation | | |
| Failed | | |
| **Execution Time* | 16 | sec |
|     Results should be: 480 sec to 1,000 sec | | |
| Fuel Burned | 0.06 | L |
| *Time Spent Counter Rotating | 0 | sec |
| Number Of Bucket Slams | 0 | |
| *Time Spent Tramming | 0 | sec |
|     Results should be: 5 sec to 60 sec | | |
| *Time Spent Tramming Machine (Left/Right) | 0 | sec |
|     Results should be: 5 sec to 60 sec | | |
| *Time Spent Stopped | 16 | sec |
|     Results should be: 480 sec to 1,000 sec | | |
| *Time Spent Swinging Left | 0 | sec |
|     Results should be: 60 sec to 180 sec | | |
| *Time Spent Swinging Right | 0 | sec |
|     Results should be: 60 sec to 180 sec | | |
| *Average Speed | 0 | km/h |
|     Results should be: 1.61 km/h to 3.22 km/h | | |
| *Distance Trammed | 0 | cm |
|     Results should be: 30.48 m to 45.72 m | | |
| *Maximum Bucket Height | 11.6 | cm |
|     Results should be: 3.05 m to 6.1 m | | |
| *Maximum Bucket Height While Tramming | 0 | cm |
|     Results should be: 1.22 m to 4.57 m | | |
| *Average Bucket Height | 11.6 | cm |
|     Results should be: 0.3 m to 3.05 m | | |
| *Average Bucket Height While Tramming | 0 | cm |
|     Results should be: 0.3 m to 3.05 m | | |
| Time Spent Digging Over Final Drive | 0 | sec |
| **Average Bucket Fill Factor | 0 | % |
|     Results should be: 80 % to 120 % | | |
| **Productivity | 0 | m³/hr |
|     Results should be: 420.49 m³/hr to 840.98 m³/hr | | |

Training Exercise Detail Report (Exam)

FIG. 26

HEAVY EQUIPMENT SIMULATION SYSTEM AND METHODS OF OPERATING SAME

CROSS-REFERENCE TO RELATED APPLICATION

This application claims the benefit of U.S. Provisional Patent Application Ser. No. 62/677,345, filed on May 29, 2018, all of which is hereby incorporated by reference in its entirety for all purposes.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The present invention relates to heavy equipment computer simulation systems and methods of operating a heavy equipment computer simulation system.

BACKGROUND OF THE INVENTION

Machines such as excavators, wheel loaders, track-type tractors, motor graders, large vehicles, and other types of heavy equipment are used to perform a variety of tasks associated with industries such as mining, farming, construction and transportation, for example. Operators of these machines may be required to receive a significant amount of training prior to operating these machines on-site. In some cases, machine operators must be licensed and certified by a certification board or governing body to operate certain equipment or vehicles to ensure that the operator has received the appropriate training.

Machine operators are generally trained in computer-based simulators and in training exercises prior to performing actual work-related operations. While these methods may provide a basic level of operational exposure, they may not provide an environment that completely prepares the operator for actual "real-world" work experiences associated with a job site. Thus, many inexperienced machine operators may require additional on-the-job training in certain areas associated with machine operation using costly fuel and manpower. Further, many experienced machine operators may require supplemental training for certain operational skills and/or new techniques associated with one or more machines. Such tasks add to the expense and time associated with completing business objectives.

Current simulation systems for heavy equipment are simplistic in displaying the simulated environment as well as in calculating and displaying how the simulated machine interacts with the environment. In addition, teaching and instructor interaction is limited.

The present invention is aimed at one or more of the problems identified above.

SUMMARY OF THE INVENTION

In different embodiments of the present invention, systems, methods, and computer-readable storage media for training an operator of a machine including interacting with a simulation mode of a heavy equipment model simulator and evaluating an operator using criteria substantially similar to an original equipment manufacturer (OEM) criteria for a non-simulated heavy equipment model are described herein. Interacting includes performing one or more simulated exercises substantially similar to an OEM exercise for the non-simulated heavy equipment model.

In one embodiment of the present invention, a heavy equipment simulation system for simulating an operation of a heavy equipment vehicle in a virtual environment is provided. The heavy equipment simulation system includes a support frame, an operator input control assembly coupled to the support frame for receiving input from a user, a motion actuation system coupled to the support frame for adjusting an orientation of the support frame with respect to a ground surface, a display device assembly configured to display the virtual environment including the simulated heavy equipment vehicle, a virtual reality (VR) headset unit adapted to be worn by the user, and a control system. The operator input control assembly includes a heavy equipment vehicle control assembly for use in operating a simulated heavy equipment vehicle in the virtual environment. The heavy equipment vehicle control assembly is configured to generate first input signals based on the user's interaction with the heavy equipment vehicle control assembly. The VR headset unit includes a VR head mounted display and a position sensor. The VR head mounted display is configured to display the virtual environment including the simulated heavy equipment vehicle. The position sensor is configured to detect an orientation of the VR headset unit and generate second input signals based on the detected orientation of the VR headset unit. The control system includes a processor coupled to a memory device. The processor is programmed to generate the virtual environment including the simulated heavy equipment vehicle, operate the simulated heavy equipment vehicle within the virtual environment based on the first input signals received from the heavy equipment vehicle control assembly, operate the motion actuation system to adjust the orientation of the support frame with respect to the ground surface based on movements of the simulated heavy equipment vehicle within the virtual environment, render the virtual environment including the simulated heavy equipment vehicle on the VR head mounted display, and render the virtual environment including the simulated heavy equipment vehicle on the display device assembly.

In another embodiment of the present invention, a method of operating a heavy equipment simulation system is provided. The heavy equipment simulation system includes a support frame, an operator input control assembly coupled to the support frame for receiving input from a user, a motion actuation system coupled to the support frame for adjusting an orientation of the support frame with respect to a ground surface, a display device assembly configured to display the virtual environment including the simulated heavy equipment vehicle, a virtual reality (VR) headset unit adapted to be worn by the user, and a control system. The method includes the control system performing the steps of generating the virtual environment including the simulated heavy equipment vehicle, operating the simulated heavy equipment vehicle within the virtual environment based on the first input signals received from the heavy equipment vehicle control assembly, operating the motion actuation system to adjust the orientation of the support frame with respect to the ground surface based on movements of the simulated heavy equipment vehicle within the virtual environment, rendering the virtual environment including the simulated heavy equipment vehicle on the VR head mounted display, and rendering the virtual environment including the simulated heavy equipment vehicle on the display device assembly.

In yet another embodiment, one or more non-transitory computer-readable storage media, having computer-executable instructions embodied thereon are provided. When executed by at least one processor, the computer-executable instructions cause the processor to generate a virtual environment including the simulated heavy equipment vehicle, operate the simulated heavy equipment vehicle within the virtual environment based on the first input signals received from a heavy equipment vehicle control assembly, operate a motion actuation system to adjust the orientation of a support frame with respect to a ground surface based on movements of the simulated heavy equipment vehicle within the virtual environment, render the virtual environment including the simulated heavy equipment vehicle on a VR head mounted display, and render the virtual environment including the simulated heavy equipment vehicle on a display device assembly.

In other aspects of the present invention, the methods of operating a heavy equipment simulation system may also include a method of simulating a physical interaction in a simulator. The method includes identifying simulated physical contact zones between two or more simulated objects and defining one or more interactions in the contact zones separate from simulated environmental or equipment object rules. Some embodiments relate to a machine-readable medium comprising instructions, which when implemented by one or more processors perform the following operations: initiating an instruction module, initiating a simulation module for controlling a machine, selecting an instruction mode, interacting with a simulation mode, compiling results, transferring results to instruction module and outputting results.

BRIEF DESCRIPTION OF DRAWINGS

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 5-27 are illustrations of exemplary screenshots of graphical user interfaces that may be generated and displayed by the control system for use with the heavy equipment simulation system shown in FIG. 1, according to embodiments of the present invention;

Corresponding reference characters indicate corresponding components throughout the several views of the drawings.

DETAILED DESCRIPTION OF THE INVENTION

Embodiments of the present invention provides a heavy equipment simulation system 10 for simulating an operation of a heavy equipment vehicle in a virtual environment. The heavy equipment simulation system 10 includes hardware and software for generating an enhanced heavy equipment simulation experience for a user in a way that more closely merges the simulation with actual work operations. Additionally, the embodiments of the present invention describe unique instructor control, instruction modules and student or user feedback systems.

The invention relates generally to heavy equipment simulation and, more particularly, to a heavy equipment simulation system 10 that can swap between rendering to a monitor and a virtual reality (VR) device instantaneously based on the VR HMD (head mounted display) position/state.

In some cases, users can encounter issues (motion sickness, discomfort, etc. . . . ) while using a HMD and may want to continue with the current simulated task while visualizing the virtual simulation through a standard monitor. The heavy equipment simulation system 10 includes heavy equipment training software that has two rendering modes. The two rendering modes include rendering to a monitor, and rendering to a VR HMD. The system 10 also allows the trainee user to switch between VR and standard play modes, during runtime, without interruption. The system 10 includes a mix of standard VR functionality combined with custom code to switch back and forth between the standard in-game camera and functionality to a VR enabled camera with standard VR head tracking functionality.

In addition, the VR HMD has the ability to track the user's head movement and position in 3D space, and this also includes a way of determining if the user is actually wearing the HMD or not. When a user puts on or takes off a VR HMD, background code keeps track of this state. The system 10 is programmed to check these states and make changes to how the program will try and render out the virtual environment scene. If the system 10 determines that a user is wearing the HMD, standard camera views and camera switching methods are disabled, and a VR ready camera is activated. If for any reason, at any time, the user decides to take off the HMD, the standard camera and functionality is restored, and the VR enabled camera along with its functionality is deactivated. This process can be repeated moving to and from the VR presentation at any time.

The desired functionality is all dependent on having everything within the game engine set to enable VR. Once this functionality is enabled, it is possible to get all the information needed about the attached HMD and start controlling the system's output to the device. Both VR and standard rendering methods need to be in place to: 1.) determine what kinds of output the system can provide, and 2.) provide the functionality to switch between them.

Figure 1:
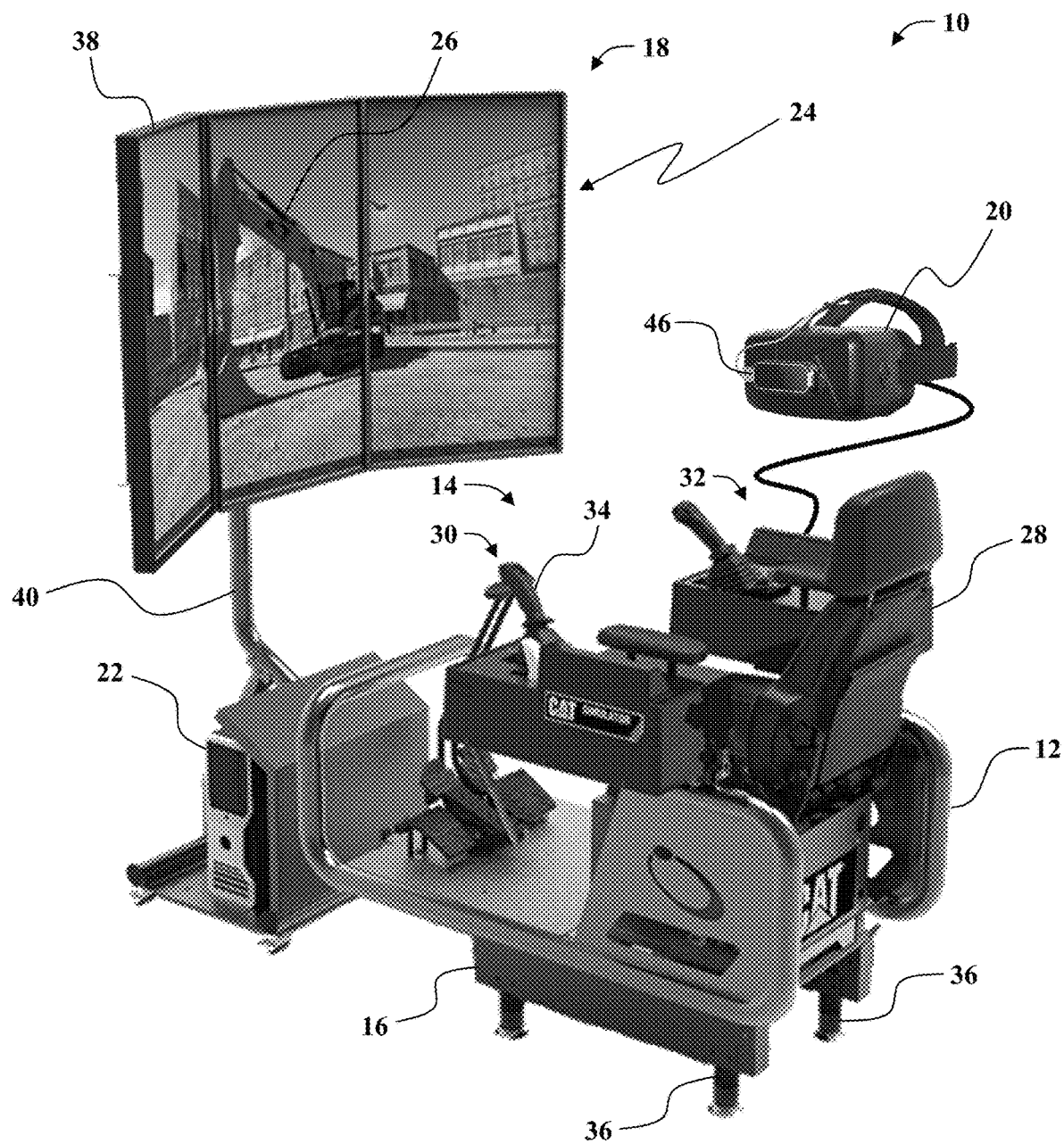
FIG. 1 is a perspective view of a heavy equipment simulation system, according to embodiments of the present invention.
Figure 2:
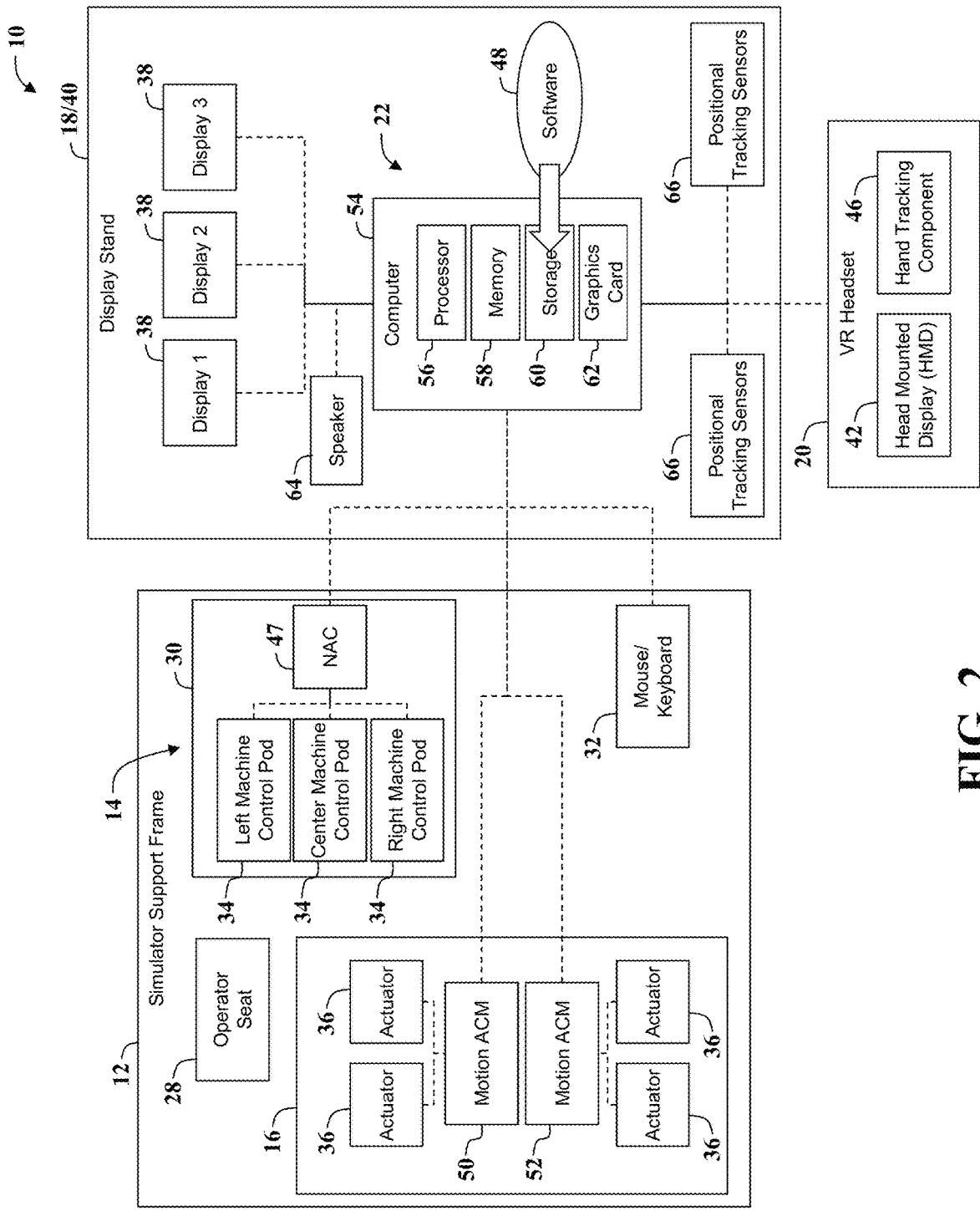
FIG. 2 is a schematic block diagram of a heavy equipment simulation system shown FIG. 1.
Figure 3:
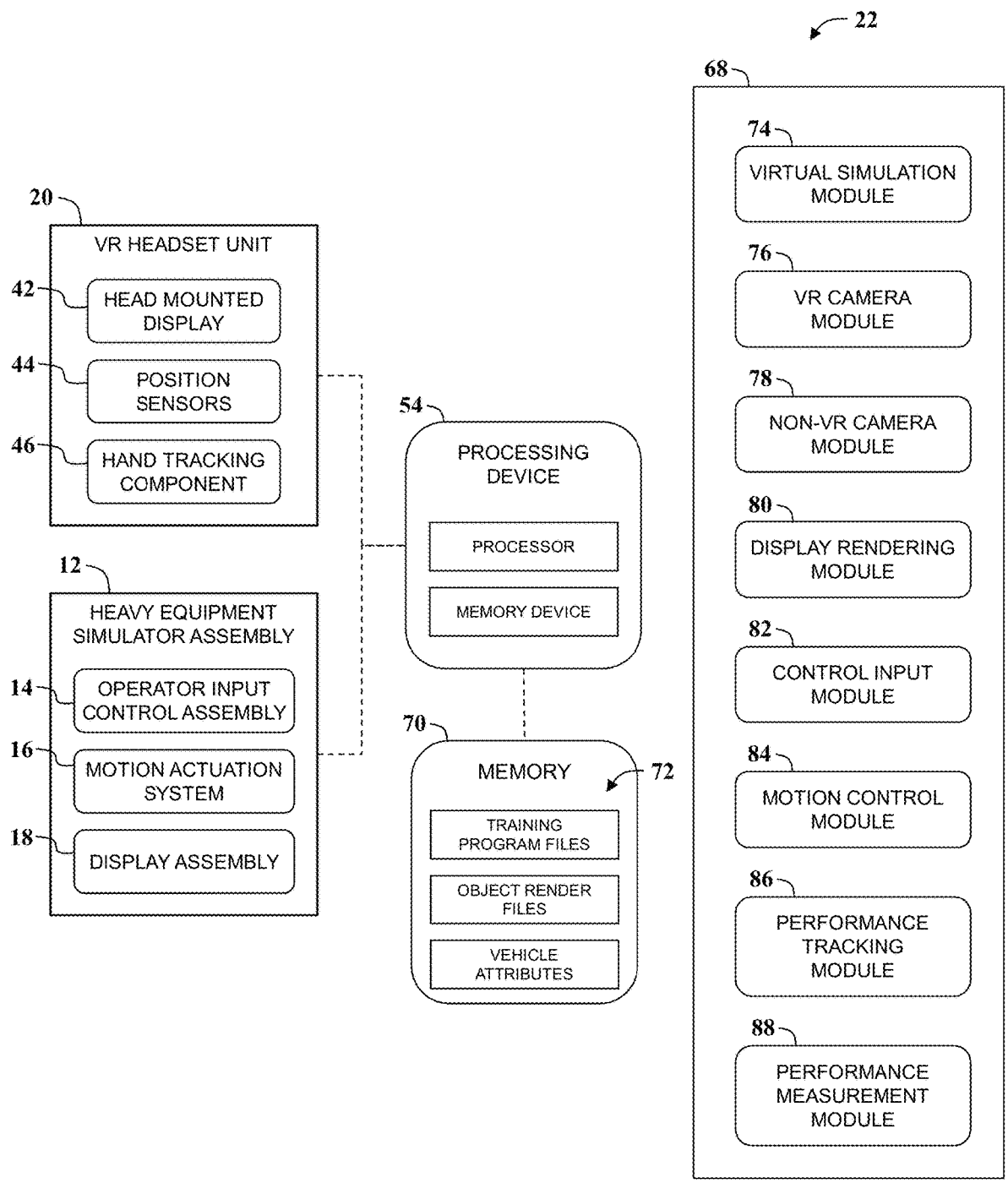
FIG. 3 is a schematic block diagram of a control system that may be used with the heavy equipment simulation system shown FIG. 1.
Figure 4:
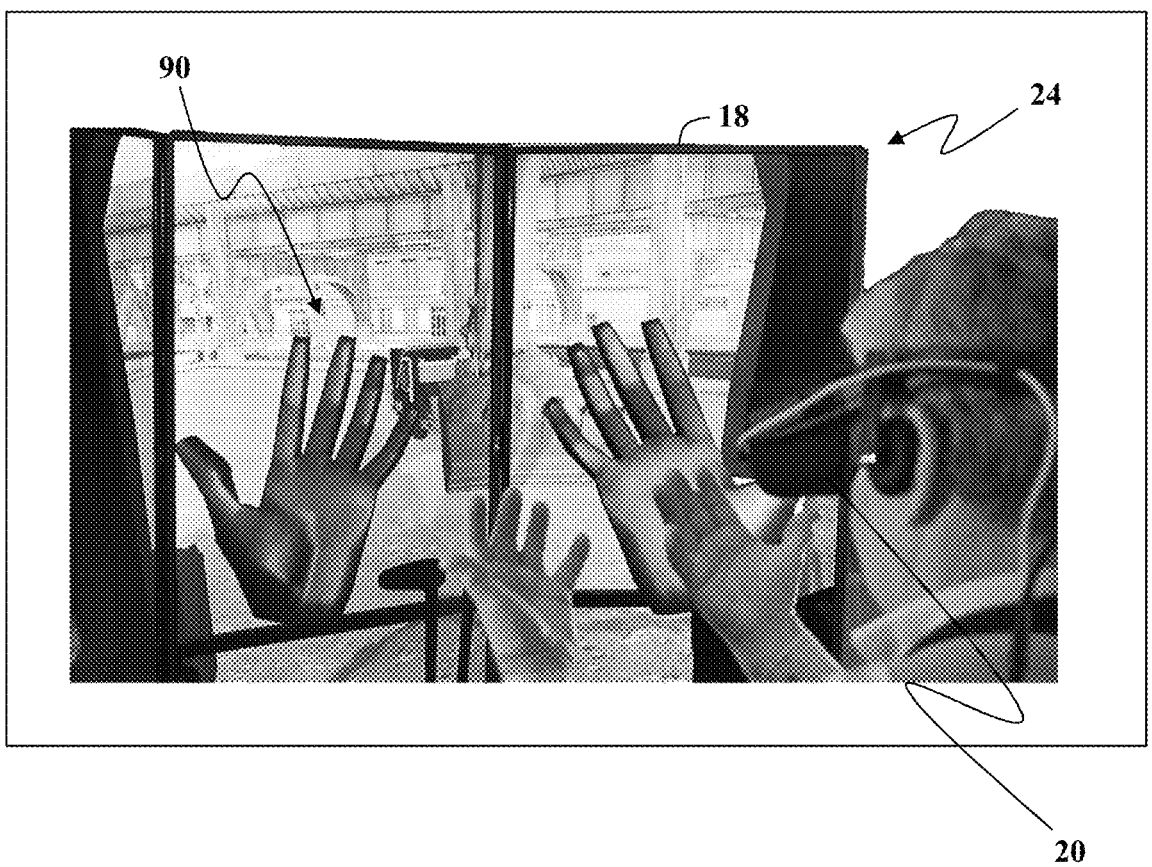
FIG. 4 is a perspective view of a portion of the heavy equipment simulation system shown in FIG. 1.
Figure 5:
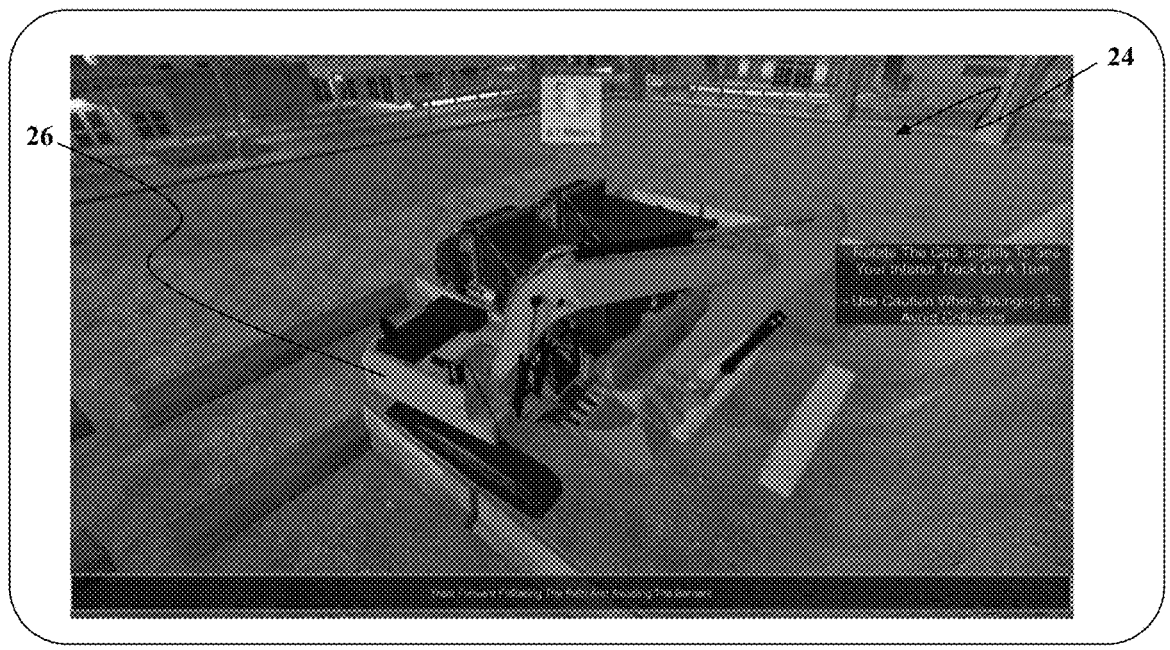
Figure 6:

Referring to FIGS. 1-3, in the illustrated embodiment, the heavy equipment simulation system 10 includes a support frame 12, an operator input control assembly 14, a motion actuation system 16, a display device assembly 18, a virtual reality (VR) headset unit 20, and a control system 22 for operating the components of the heavy equipment simulation system 10. The heavy equipment simulation system 10 generates and displays a virtual environment 24 including a simulated heavy equipment vehicle 26 (shown in FIGS. 1, and 4-6) and operates the simulated heavy equipment vehicle 26 based on user commands received via the operator input control assembly 14 to simulate the operation of a physical heavy equipment vehicle.

The operator input control assembly 14 includes an operator seat 28 for supporting the user from the support frame 12, a heavy equipment vehicle control assembly 30, and a user input device 32. The heavy equipment vehicle control assembly 30 includes physical vehicle input controls 34 for use in operating the simulated heavy equipment vehicle 26. The physical vehicle input controls 34 are similar to the input controls and control panels found in corresponding physical heavy equipment vehicle to enable the user to experience a real-life operation of a heavy equipment vehicle in a simulated virtual environment. The heavy equipment vehicle control assembly 30 is also configured to generate first input signals based on the user's interaction with the heavy equipment vehicle control assembly 30 and transmit the first input signals to the control system 22 indicating a desired operation of the user. The user input device 32 may include a mouse and keyboard input device that is configured to receive input from the user to enable the user to operate the system 10.

The motion actuation system 16 includes a plurality of actuators 36 that are coupled to the support frame 12 for adjusting an orientation of the support frame 12 with respect to a ground surface. The motion actuation system 16 may be operated to adjust the orientation of the support frame 12 with respect to the ground surface based on movements of the simulated heavy equipment vehicle 26 within the virtual environment 24.

The display device assembly 18 includes a plurality of display monitors 38 that are coupled to a support assembly 40. The support assembly 40 is configured to support the plurality of display monitors 38 from the ground surface. The display device assembly 18 is operated to display the virtual environment 24 including the simulated heavy equipment vehicle 26 to the user. The display device assembly 18 is spaced a distance from the support frame 12 to enable the user to view the virtual environment 24 being displayed on the plurality of display monitors 38 when the user is seated in the operator seat 28.

The VR headset unit 20 is also operated to display the virtual environment 24 including the simulated heavy equipment vehicle 26 to the user. The VR headset unit 20 is adapted to be worn about the head of the user and is configured to render the virtual environment 24 in a more realistic virtual reality setting to the user. The VR headset unit 20 includes a VR head mounted display 42 and one or more position sensors 44 mounted to the VR headset unit 20. The VR head mounted display 42 is configure to display the virtual environment 24 including the simulated heavy equipment vehicle 26 in a virtual reality setting. The position sensors 44 are configured to detect an orientation of the VR headset unit 20 and generate second input signals based on the detected orientation of the VR headset unit 20. The VR headset unit 20 may also include a hand tracking component 46 that includes one or more infrared sensors mounted to the VR headset unit 20 and that are configured to detect a position of the user's hands.

Referring to FIGS. 1-3, in one embodiment, the heavy equipment simulation system 10 includes a hardware platform whose main components consist of a tubed metal frame for use with the support frame 12 and a metal display stand for use with the display device assembly 18. The frame 12 contains an operator seat 28, the heavy equipment vehicle control assembly 30 including a plurality of machine control pods 34 which are connected via RJ45 network connections to a Network Area Concentrator (NAC) 47 that communicates via a proprietary CAN/J1939 protocol to carry all of the control signals back to the control system 22 over a Universal Serial Bus (USB) connection. The machine control pods 34 are secured to the frame and contain machine specific Original Equipment Manufacturer (OEM) controls that serve as inputs to the simulation software 48 executed by the control system 22. The motion actuation system 16 contains a 3 degree-of-freedom (DOF) motion system that is communicatively coupled to the control system 22 over a USB connection. The motion actuation system 16 has two motion Actuator Control Modules (ACM) 50, 52 mounted underneath the frame 12 which are connected via shielded RJ45 network connections. Each ACM 50, 52 is then connected to two actuators. A first ACM 50 is connected to a first pair of actuators 36, and a second ACM 52 is connected to a second pair of actuators 36. The user input device 32 contains a wireless mouse and keyboard. The support assembly 40 includes a display stand contains supports the control system 22 which includes a computer processing device 54, which contains a processor 56, memory 58, storage 60, and graphics card 62. A specific example of a suitable computer platform is a Dell5820 but it is to be understood that the teachings herein can be modified for other presently known or future hardware platforms. A specific example of a suitable computer graphics card is a NVIDIA GTX1080 but it is to be understood that the teachings herein can be modified for other presently known or future cards. The display stand 40 contains an audio speaker 64 that is connected to the computer processing device 54 over a USB connection. The support frame 12 has two positional tracking sensors 66 that are communicatively coupled to the computer processing device 54 over USB connections. The display stand 40 has three display monitors 38, which are connected to the computer processing device 54 graphics card 62 over HDMI and/or DisplayPort for rendering a simulated view. The display monitors 38 may include LED displays, LCD displays, or any suitable display device for displaying computer-generate images. The heavy equipment simulation system 10 currently has three displays 38 acting as a single view, but it is to be understood that the teachings herein can be modified for other presently known or future combinations of displays acting as multiple views. The heavy equipment simulation system 10 also includes the VR headset unit 20 that is connected to the computer processing device 54 over USB and to the graphics card 62 over HDMI. A specific example of a suitable VR headset unit 20 is the Oculus Rift™ but it is to be understood that the teachings herein can be modified for other presently known or future Head Mounted Displays. The VR headset unit 20 also interacts with the positional tracking sensors 66 over infrared using outside-in tracking to send specific locations of the HMD to the software 48. The heavy equipment simulation system 10 contains a hand tracking component 46 which is mounted on the VR headset unit 20 but communicates directly with the computer processing device 54 over USB.

While the machine-readable medium 60 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding or carrying a set of instructions for execution by the machine and that cause the machine to perform any one or more of the methodologies of the embodiments of the present invention. The term "machine-readable medium" shall accordingly be taken to include, but not be limited to, solid-state memories, optical and magnetic media, and carrier wave signals.

Referring to FIG. 3, in some embodiments, the control system 22 may include one or more software modules 68 that include computer-executable instructions that are executed by the processor 56 to perform the algorithms illustrated in FIGS. 29-33 and described herein, to operate the heavy equipment simulation system 10. A memory device 70 including the memory 58 and storage 60 may also store one or more data files 72 that include information that may be used by the processor 56 when executing the computer-executable instructions for each software modules 68. The memory device 70 includes at least some form of computer readable media. By way of example and not limitation, computer readable media may include computer storage media including volatile and nonvolatile, removable and non-removable media implemented in any method or technology that enables storage of information, such as computer readable instructions, data structures, program modules, or other data.

In the illustrated embodiment, the control system 22 includes a virtual simulation module 74, a VR camera module 76, a non-VR camera module 78, a display rendering module 80, a control input module 82, a motion control module 84, a performance tracking module 86, and a performance measurement module 88.

The virtual simulation module 74 generates the virtual environment 24 including the simulated heavy equipment vehicle 26 using the object render files and vehicle attribute files stored in the memory device 70. The VR camera module 76 is programmed to establish a VR camera viewpoint location within the virtual environment 24 that is used to render a VR camera viewpoint based on the VR camera viewpoint location. For example, in one embodiment, the VR camera module 76 establishes the VR camera viewpoint location within a cab of the simulated heavy equipment vehicle 26 to provide the user with a first-person view sitting with the cab of the simulated heavy equipment vehicle 26. The VR camera viewpoint is used to render images of the virtual environment on the on the VR head mounted display 42. In some embodiments, the virtual simulation module 74 may include a Unity™ game engine.

The non-VR camera module 78 is programmed to establish a non-VR camera viewpoint location within the cab of the simulated heavy equipment vehicle 26 within the virtual environment 24 that is used to render a non-VR camera viewpoint of the virtual environment 24 on the display device assembly 18 based on the non-VR camera viewpoint. In one embodiment, the non-VR camera viewpoint location is adjacent to the VR camera viewpoint location within the cab of the simulated heavy equipment vehicle 26.

The display rendering module 80 is programmed to render images of the virtual environment 24 on the display device assembly 18 and the VR head mounted display 42. The display rendering module 80 is also programmed to operate in a VR display mode to simultaneously render and display the VR camera viewpoint on the VR head mounted display 42 and the display device assembly 18. The display rendering module 80 is also programmed to operate in a non-VR display mode to render and display the non-VR camera viewpoint of the virtual environment 24 on the display device assembly 18.

The control input module 82 is programmed to receive first input signals indicating the user's interaction with the heavy equipment vehicle control assembly 30 and operate the simulated heavy equipment vehicle 26 within the virtual environment 24 based on the first input signals received from the heavy equipment vehicle control assembly 30.

The motion control module 84 is programmed to operate the motion actuation system 16 to adjust the orientation of the support frame 12 with respect to the ground surface based on movements of the simulated heavy equipment vehicle 26 within the virtual environment 24.

The performance tracking module 86 is programmed to implement a simulated training exercises within the virtual environment that requires the user to operate the simulated heavy equipment vehicle 26 through a series of predefined tasks. The performance tracking module 86 also monitors various performance parameters associated with the user's operation of the simulated heavy equipment vehicle 26 during the simulated training exercises.

The performance measurement module 88 is programmed to receive the monitored performance parameters from the performance tracking module 86 and generate various evaluation scores based on the performance parameters and output various performance reports to display the evaluation scores. In some embodiments, the performance tracking module 86 and/or performance measurement module 88 include SimU Campus™ Training Management software.

Motion/Actuators: The motion system 16 is being sent data from the vehicle's rigid body chassis setup. This data consists of the chassis' yaw, pitch, roll, angular velocity, and linear velocity. Along with the chassis telemetry data there is also a need for information from the tracks or tires which vary depending on the machine. From a tracked machine all that is needed is the ground speed of the track, but for wheeled vehicles there is a need to know information from the outer most four tires. The tire information needed includes tire load, tire slip and suspension travel. Along with this data there is also a need for the angular acceleration of the front most and rear most axles.

Once gathered from the vehicle, all this data is transmitted into the provided D-BOX motion DLL. This DLL is created and provided by D-BOX for our use. The DLL consumes the information and translates that into the linear actuators connected to the PC via USB. The actuators are bolted to the simulator frame and are each connected to one central hub that is receiving the signals from the PC's USB output. They are capable of lifting the simulator frame vertically with each actuator moving independently to provide pitch (front/rear tilt), roll (left/right tilt), and heave (vertical up/down motion).

The motion system receives the vehicle's chassis orientation (yaw, pitch, roll), local velocity, and angular velocity. From the engine, the motion system receives engine power, max rpm, red line rpm, idle speed, engine rpm, and transmission gear. Some variables that are sent in from the vehicle can depend on if the vehicle is a tracked or wheeled vehicle. If the vehicle has tracks, the left and right track speeds are sent, but if the vehicle has wheels each tire's wheel slip, load, and acceleration are sent. The final items that the motion system receives are suspension travel from the front and rear right and left suspension components. The motion DLL takes the values and converts those into the signals being sent to the motion actuators. This is all handled by the DBox motion software.

Camera Frame: The cameras within the simulator are elements very similar to the objects used to make up the different parts of the vehicle model itself, except they are standard components of the Unity™ game engine and require no extra coding to render out the 3D images. Unity's cameras are used in a few different ways to obtain the desired results for the simulators, but all consist of taking a camera object and attaching it to a base object that provides extra functionality to move the camera around the 3D environment.

These base objects are used to give the camera the ability to freely move around in 3D space, orbit around the vehicle (rotate 360 degrees around the vertical axis of the chassis and close to 180 degrees around the horizontal axis while focusing on the chassis), act as the user's main in-cab view (simulating the users head and allowing limited rotation), and attaching the virtual reality (VR) camera to the machine's chassis. When the camera is attached to a mount that is attached to the chassis (in-cab mount/VR mount) the camera becomes part of the chassis and will follow the vehicle's position as it moves in 3D space.

The in-cab mount will allow the user to rotate the camera a certain amount vertically and horizontally (amount can vary depending on the machine) using the mouse. The VR mount is similar to the in-cab mount but all camera position and rotational movement is being input by the user's head mounted display (HMD) and the spatial tracking cameras provided with the VR device. The orbit mount is similar to the in-cab and VR mounts in the fact that they are all attached to one position on the machine's chassis. This means that no matter the position or rotation around the vehicle, the orbit camera will follow the machine throughout the environment. The free fly mount is usually not allowed in the production version of the simulator, but can be provided in custom builds for customers. This camera mount is special in that it is the only mount that is not attached to the vehicle chassis. Using mouse and keyboard input, the free fly mount can move the camera anywhere in the 3D environment with the keyboard providing positional movement and the mouse controlling the rotational movement.

Oculus Rendering. As discussed in the Camera Frame portion, the simulator uses a mount system to attach cameras to the machine's chassis, but the camera itself contains all the game engine specific code that converts the standard camera view to a VR presentation. This requires a few items to be set within Unity before any of the VR functionality will work. When using an Oculus™ HMD 20, Unity™ will need the Oculus asset packages to be installed, Unity's XR settings have to be enabled, and the Oculus SDK has to be added to the list of Virtual Reality SDKs. When all of these settings are correct the simulator can be rendered into the HMD.

With this base functionality enabled the foundation of the unique VR switching can be setup. Each camera that is intended to render to a screen and not in VR will need to be set to render to the desired screen. Once the standard cameras are setup, the VR camera can now run independently.

The VRDeviceConnectionManager.cs script controls the majority of the informational displays (VR ready/not ready, remove headset, and calibration instructions displays), but also controls what cameras are active to reduce rendering overhead. Cameras can be added to this script to enable and disable cameras depending on if the user is wearing the headset or not. Beyond switching cameras; one of this scripts main duties is to enable/disable VR depending on certain conditions. Since one of the main goals of the simulator is to give operators the feeling of the realistic controls and their placement; VR is not enabled until after the machine has been started and is ready to move. This allows operators to gain muscle memory and spatial awareness of what controls are needed to begin machine operation. When the machine is ready to be shutdown VR will be disabled and the user will remove the headset and use the hardware controls to perform the shutdown procedures. Another deciding factor in VR being enabled or disabled is the Leap Motion controller. If the Leap Motion controller is not working properly or not detected VR will be disabled and the VR Not Ready badge will be presented on screen. This is also true of the VR headset itself; if it is not detected or is malfunctioning the VR Not Ready badge will be displayed. If all devices are present and working, and startup procedures have been passed, the VR Ready badge will be displayed and the user is free to put on the headset. If the user removes the headset at any time during the simulation the VR camera will be disabled and the standard cameras will be enabled, and the simulation will continue, but the rendering will switch from the VR headset to the standard screens.

All the 3-D models remain the same for VR and non VR use, but there is a dedicated VR camera within the virtual environment. Along with the VR camera there is a non VR camera that resides in the same position as the VR camera. Both have separate methods of control as the VR camera is receiving signals from the headset as to where it should be positioned and how it should be oriented, and the non VR camera's orientation can be controlled using the mouse. The TV monitors show the view from one of the "eyes" of the VR headset when the headset is in use. When it is not in use the TVs display the simulator from the view of the non VR camera. Within Unity (the game engine), code is running that checks a sensor attached to the headset. This sensor checks to see if there is anything close to the inside of the headset. Once it senses something the game engine sets a flag that says the headset is in use and position and orientation data is now available. Once this flag is set in the code, the control system 22 created checks to see what cameras are active in the scene and deactivates cameras that are not presenting in VR and activates the VR camera. There is only one VR camera in the scene.

In the illustrated embodiment, the processor 56 of the control system 22 is programmed to execute a plurality of algorithm steps to operate the heavy equipment simulation system 10 to simulate a training exercise. For example, to execute the training exercise, the processor 56 may be programmed to execute the algorithm steps including generating the virtual environment 24 including the simulated heavy equipment vehicle 26, and operating the simulated heavy equipment vehicle 26 within the virtual environment 24 based on the first input signals received from the heavy equipment vehicle control assembly 30. The processor 56 also operates the motion actuation system 16 to adjust the orientation of the support frame 12 with respect to the ground surface based on movements of the simulated heavy equipment vehicle 26 within the virtual environment 24.

The processor 56 also renders the virtual environment 24 including the simulated heavy equipment vehicle 26 on the VR head mounted display 42, and renders the virtual environment 24 including the simulated heavy equipment vehicle 26 on the display device assembly 18.

In the illustrated embodiment, the processor 56 is programmed to operate the heavy equipment simulation system 10 in the VR display mode by establishing the VR camera viewpoint location within a cab of the simulated heavy equipment vehicle 26 within the virtual environment 24, rendering a VR camera viewpoint of the virtual environment 24 on the VR head mounted display 42 based on the VR camera viewpoint location. In addition, when operating in the VR mode, the processor 56 monitors the orientation of the VR headset unit 20 based on the second input signals received from the VR headset unit 20, and adjusts an orientation of the rendered VR camera viewpoint based on changes in the orientation of the VR headset unit 20.

The processor 56 may also be programmed to operate in the VR display mode by simultaneously rendering the VR camera viewpoint of the virtual environment 24 on the display device assembly 18 and the VR headset unit 20.

In one embodiment, the processor 56 may be programmed to receive signals from the hand tracking component 46 mounted to the VR headset unit 20 and operate in the VR display mode by rendering images of simulated user hands 90 (shown in FIG. 4) within the virtual environment 24 based on the detected position of the user's hands.

The processor 56 is also programmed to operate the heavy equipment simulation system 10 in the non-VR display mode. In the non-VR display mode, the processor 56 establishes a non-VR camera viewpoint location within the cab of the simulated heavy equipment vehicle 26 within the virtual environment 24 and renders a non-VR camera viewpoint of the virtual environment 24 on the display device assembly 18 based on the non-VR camera viewpoint location. In addition, the processor 56 is programmed to not render the VR camera viewpoint on the VR head mounted display 42 when operating in the non-VR camera mode. For example, upon enabling the non-VR camera viewpoint of the virtual environment, the processor 56 may disable the VR camera viewpoint.

When operating in the non-VR mode, the processor 56 is also programmed to receive third input signals from the user input device 32 based on based on the user's interaction with the user input device 32. The user input device 32 is configured to generate the third input signals based on the user's interaction with the user input device 32 for adjusting an orientation of a displayed viewpoint of the virtual environment 24. The processor 56 is programmed to operate in the non-VR display mode by adjusting an orientation of the rendered non-VR camera viewpoint based on the third input signals received from the user input device 32.

The processor 56 is also programmed to operate in the VR mode or the non-VR mode based on the detected orientation of the VR headset unit 20. For example, the VR headset unit 20 is adapted to be worn on a head of the user. The processor 56 may be programmed to switch from operating in the VR mode to operating the non-VR mode upon detecting the VR headset unit 20 has been removed from the head of the user.

Vehicle Documentation:

The following describes the algorithms and concepts used by the control system 22 in vehicle simulations and the process of building a basic simulated heavy equipment vehicle 26 within the virtual environment 24.

Powertrain. The powertrain consists of several parts (such as engines, transmissions, differentials, etc.) linked together with shafts. In the powertrain simulation model, torque and inertia is always passed from the torque generator, downstream (e.g. Engine->Transmission->Wheels) and the angular speed is solved and always passed upstream (Wheels->Transmission->Engine).

Shafts. Shafts exist to link parts together and relay data from one part to the next. This data includes Torque, Speed, Inertia, and whether the torque is a braking torque.

Parts. Parts will generally define several input and/or output shafts that allow the control system 22 to link them together. The parts are responsible for modifying powertrain data and the shafts are responsible for relaying the modified data. Power generation and speed solving can happen within many different parts. For example, a torque converter will solve speed for its input shaft and generate torque for its output shaft, based on the speed difference between the two. The control system 22 can typically create a vehicle using the premade parts that have been developed, and users can always create custom part by inheriting from PartScript and implementing a unique Step( )function.

Premade Parts: the control system 22 includes a list of parts built into the shared library: AxleScript, CurveBasedTorqueConverter, Differential Script, EngineScript, SteeringDifferentialScript, TorqueConverterScript, TransmissionScript.

Wheels: A custom wheel collider has been developed to better support tire simulations. The wheel uses a typical spring and damper type of simulation for the suspension forces, but the control system 22 also applied spring and damper concepts for tire deflection. The built-in wheel collider that ships with Unity™ only applies friction force to a wheel to move it towards a zero velocity. The equation is something like this: Force=−Velocity*Friction.

However, this means that no force gets applied if velocity is 0. Other forces may act upon the machine causing it to move a little bit during the next simulation step. The friction forces would not get applied until the frame after the wheel starts moving. The result is a cycle of movement and friction forces, occurring alternately, allowing the machine to slowly slide along the ground over time. This is especially problematic when high outside forces are being applied to the machine, such as when parking on a hill.

Tire Deflection Forces: Our wheel addresses sliding issues by using a spring and damper system to represent the flexing rubber forces on a tire (tire deflection). Our wheels maintain a contact point on the ground that is advanced as a tire spins or slips. When a machine is parked on a hill, spring and damper forces move the wheels towards their contact point. There is a maximum amount of force that the spring can apply to push towards the contact point, and if that is exceed, the contact point can move, simulating the breaking of traction, and the machine begins to slide. By using this model, the control system 22 eliminates the Velocity portion of the equation when static friction is in effect, and a machine with 0 velocity can have forces applied to counteract outside pushes and pulls by simulating the spring movement allowed with tire deflection. The forces are based on distance from the contact point rather than the velocity of movement. When the tire begins slipping, the control system 22 uses a combination of the tire deflection forces as well as a velocity modifier to apply forces back to the machine. Everything about how the machine is propelled goes through this tire deflection logic. To move the machine forward, the Axle simulates a new wheel speed by reading torque data from upstream parts, and accumulating wheel forces to generate an acceleration value. This wheel speed is used to advance the contact point forward, causing the deflection spring to apply a force to the chassis to propel the vehicle forward. All outside forces acting on a machine affect the powertrain through tire deflection. For example, digging resistance forces applied to the machine keep the machine chassis held back while tire rotation moves the contact point forward. The deflection spring generates force due to this separation in the wheel position and its contact point, and that force is used to compute a torque on the wheel which slows the wheel down. This reduction in speed is propagated through the powertrain and may cause the engine bog down.

Figure 7:
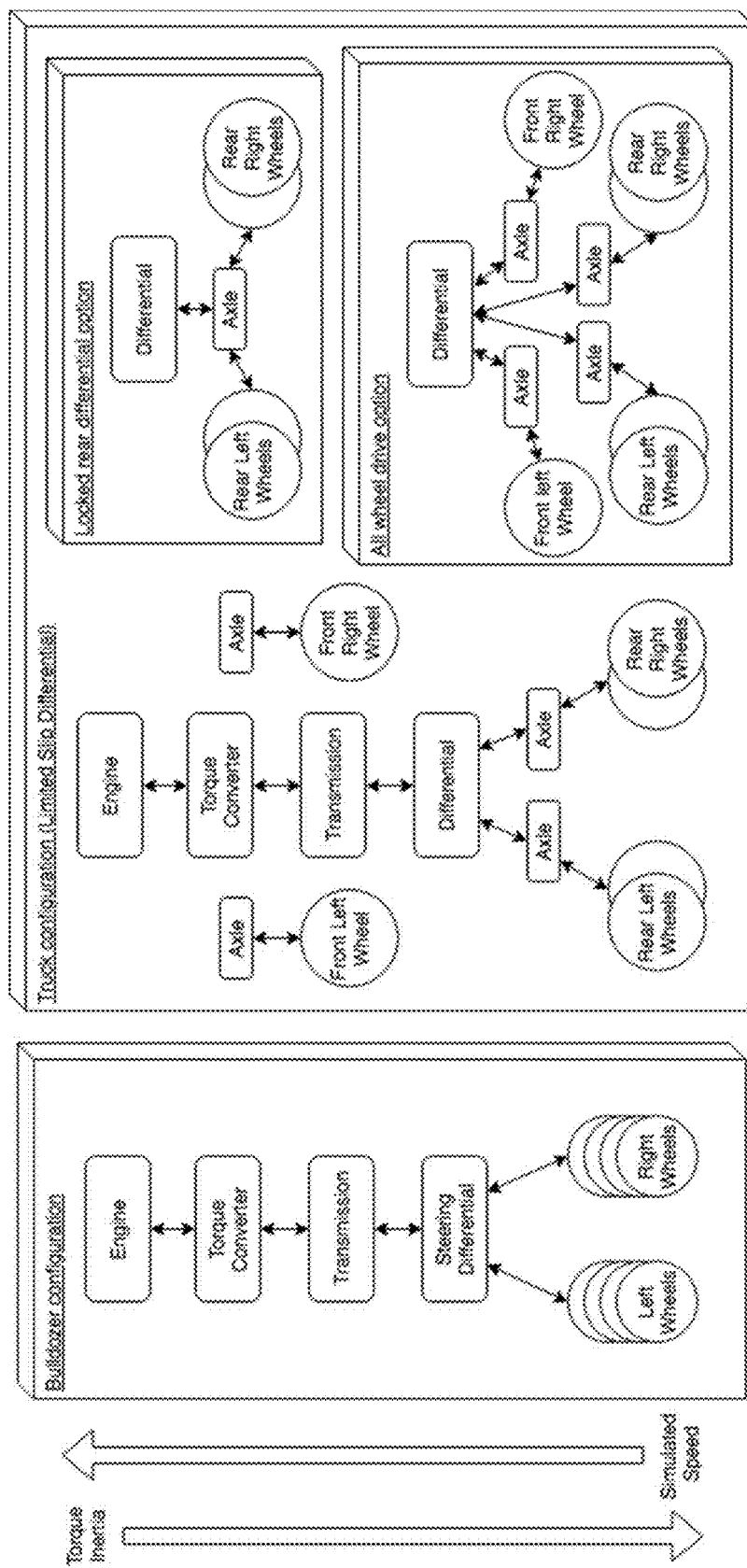

Visualizing Powertrain Design: FIG. 7 illustrates an example powertrain configuration.

Figure 8:
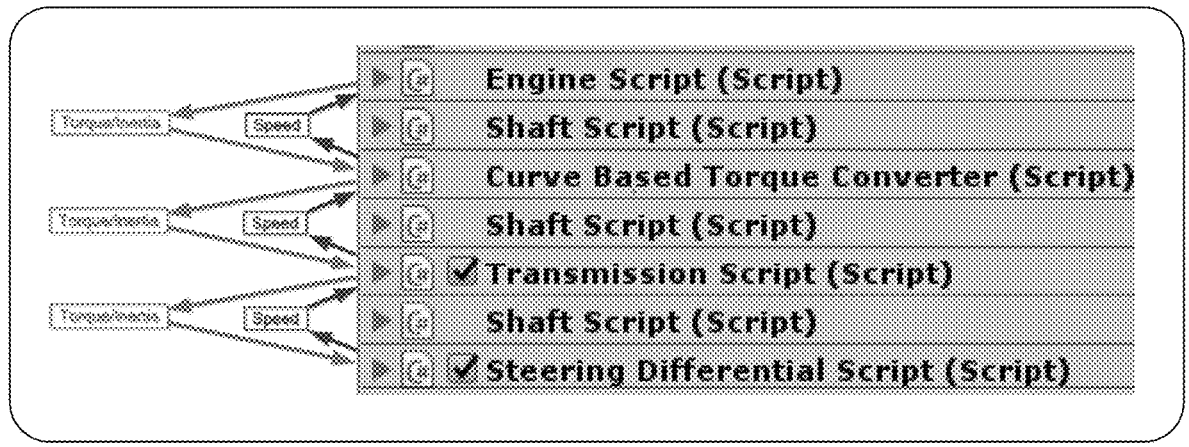

Powertrain in Unity™ software: When applying powertrain components in Unity™, the control system 22 will have a series of part and shaft components to build out the simulation. FIG. 8 illustrates an example shows a bull dozer component layout.

Figure 9:
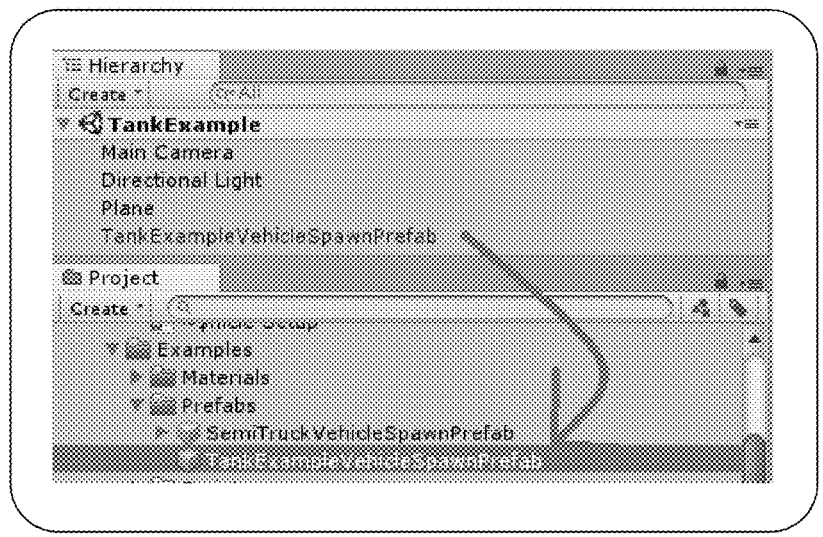

Creating The Prefab:

The vehicle should be built using a prefab whose pivot is positioned at ground level so a vehicle can easily be dragged into the scene. To do this, the control system 22 might create a ground plane at (0,0,0), and then create an empty game object at that same position. The control system 22 may be used to rename the game object and then drag it from the "Hierarchy" window (as shown in FIG. 9) into the "Project" window to create the prefab.

Build the vehicle's physical presence:

For this step, the user will need to bring in the vehicle's models (physical and visual), add collider components, rigid bodies, and joint up any parts that need to be constrained. For the most part, the control system 22 can use generic Unity constraints. The software may have some special constraints that specifically help with heavy equipment development scenarios.

Special constraints: HydraulicScript—the control system 22 has a hydraulic class that supports the specific functions that the control system 22 need to simulate, such as overpowering a pressure relief valve, float mode, and velocity targets. VelocityRevoluteConfigurableScript—The velocity revolute script is useful for simulating a velocity based hydraulic motor, such as the swing drive on an excavator.

Figure 10:
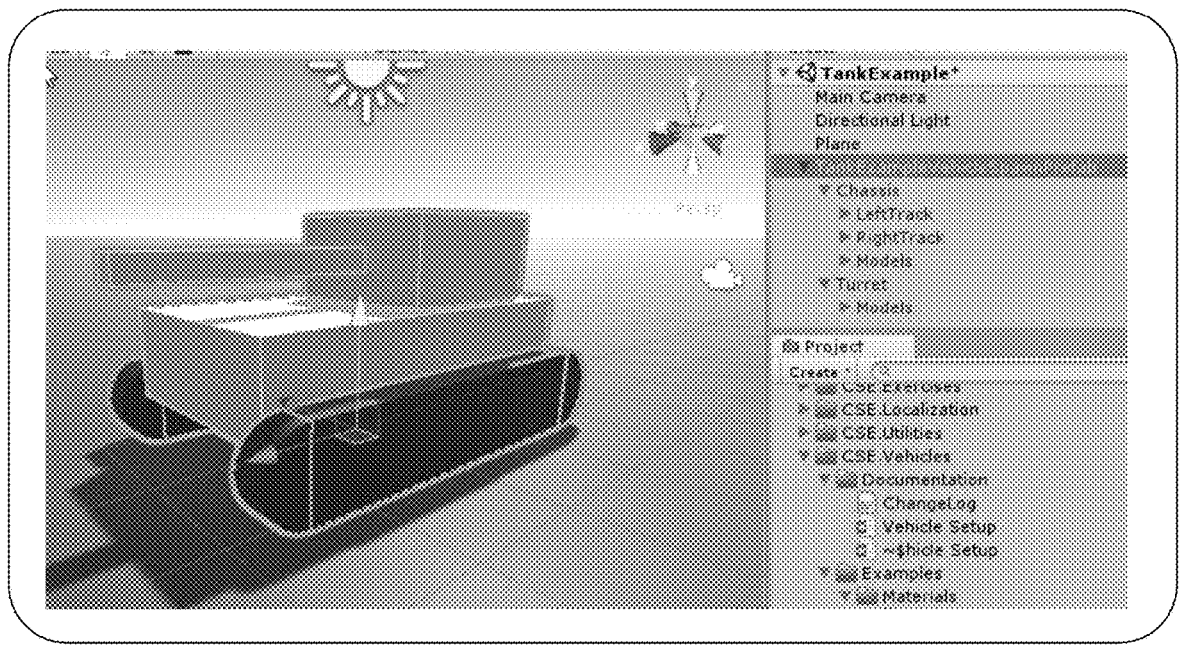
Figure 11:
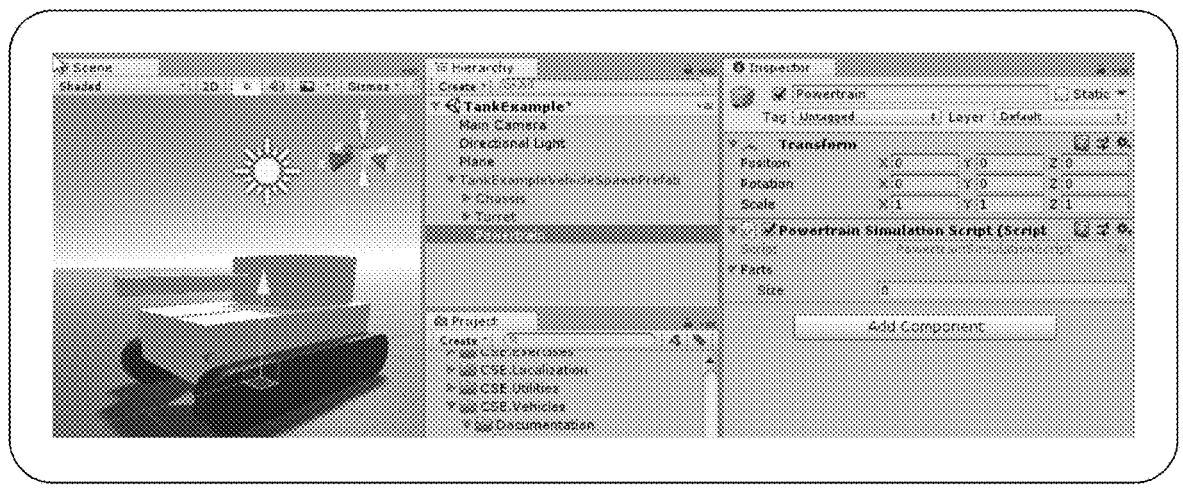

Finish Assembly: the control system 22 should now have something that represents a vehicle with colliders, models, rigid bodies, and joints. The rigid bodies have a somewhat realistic mass as a whole for the vehicle, with each object's mass within a 1:10 ratio of the other objects. Apply this to the prefab (as shown in FIG. 10).

Figure 12:
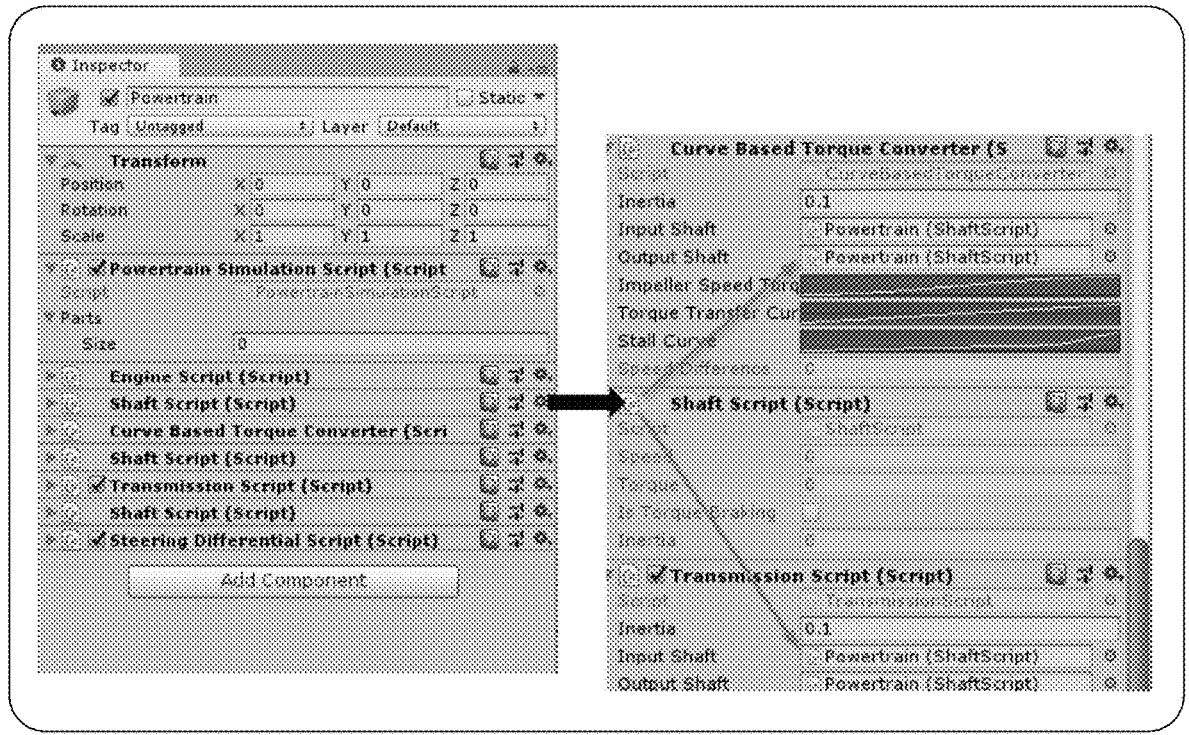
Figure 13:
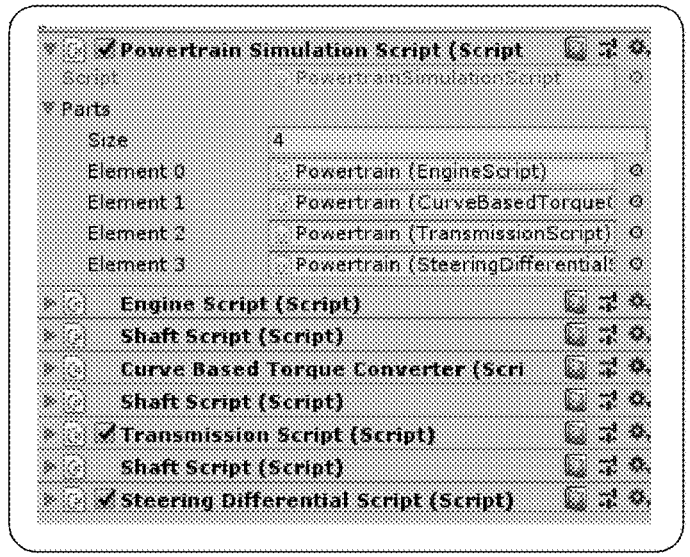
Figure 14:
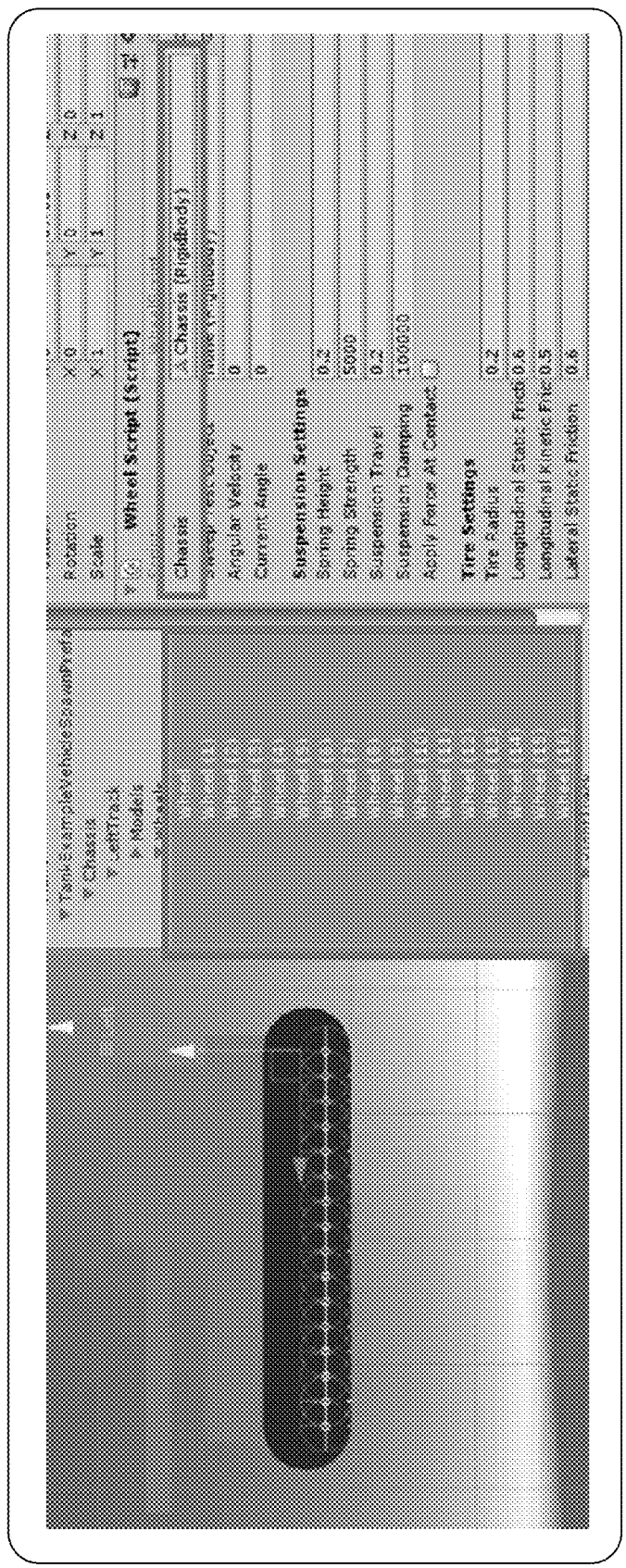
Figure 15:
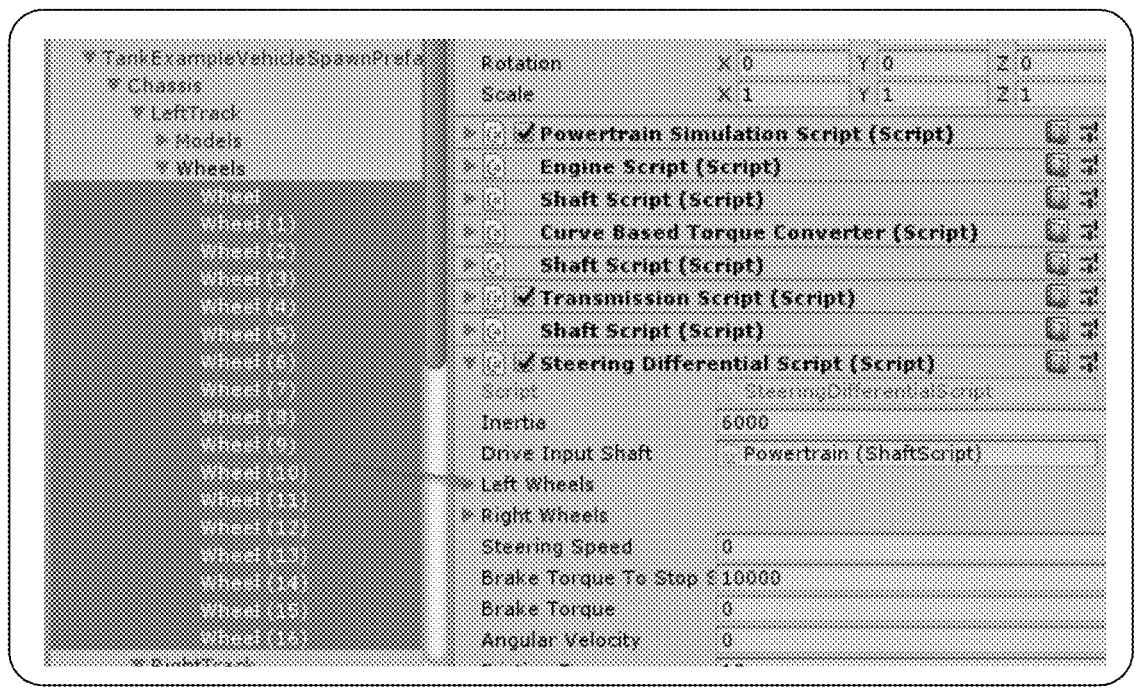
Figure 16:
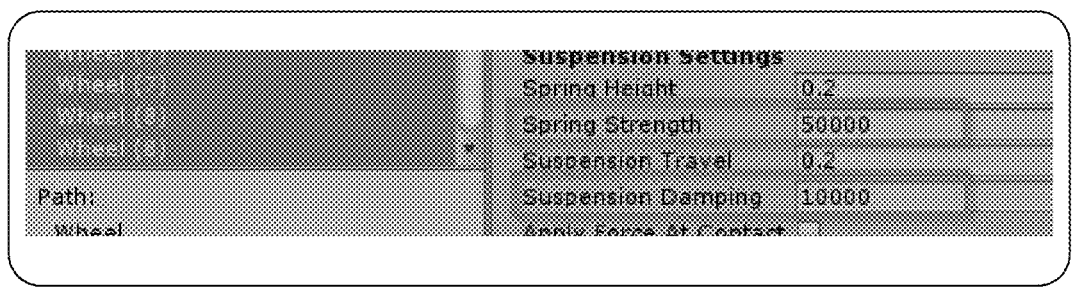

Building the Powertrain:

FIGS. 10-16 illustrate various display screens that may be displayed by the control system 22 to assist the user in building a vehicle powertrain for use with simulated heavy equipment vehicle 26. In the illustrated example, the control system 22 enables a user to set up a tank that uses differential steering. Powertrain GameObject—Create an empty game object as a child of the prefab named powertrain. Assign a PowertrainSimulationScript component to this game object (shown in FIG. 11). Adding Powertrain Components and Connecting Shafts—Add additional components to the powertrain game object to design the powertrain. The control system 22 will use an engine, a curve-based torque converter, a transmission, and a steering differential in this case. The engine's torque curve, brake torque curve, and the transmissions gear ratios are configured to the specifications. Shaft components are placed in between each part and assign the shaft to the output of the component above and the input of the component below, as shown in FIG. 12). Configuring the Powertrain Simulation—Now the control system 22 needs to add each Part to the powertrain simulation component in the order the control system 22 will need them to simulate, as shown in FIG. 13 (typically from the power generator to the wheels). Add Some Wheels—The steering differential has wheel assignment lists so that the speed calculations can be applied to both tracks at the same time, as shown in FIG. 14. This allows for faster convergence on a good simulation result. If the control system 22 has colliders on the tracks, remove them, or put them into a collision layer that doesn't collide with the terrain. For a track, the control system 22 will create multiple wheels inline to give many contact points along the length of the track. For each wheel, add a game object as a child of the track and assign a WheelScript component. Assign the Chassis for which the control system 22 wants the wheels to apply forces. Connect Wheels to the Powertrain—as shown in FIG. 15, the control system 22 allows the user to connect the wheels to the powertrain. In many cases, the control system 22 would assign the wheels to AxleScripts that have been created during the powertrain setup. For the tank, the control system 22 will assign the wheels to the SteeringDifferential (perform this for the left track and the right track). Adjust the wheels spring/damper—as shown in FIG. 16, the control system 22 allows the user to run and adjust the spring and damper values for the wheels until they properly support the vehicle.

The Scripts:

The control system 22 will need an input manager and a vehicle controller to drive the vehicle (at a minimum). In many cases, the control system 22 will also have a transmission controller to run the automatic shifting of the transmissions.

Input Manager:

The input manager is responsible for taking input from the hardware, sanitizing it into a logical format, and exposing it to the vehicle. There will be an input manager for each type of hardware the control system 22 may use with the vehicle. The control system 22 will likely have a KeyboardInputManager and a HardwareInputManager, but any number of additional input managers could be built. When sanitizing input, the user should always choose the type of data that makes the most sense from the vehicle developer's perspective. For example, some hardware uses 4 buttons that could be true or false to indicate the throttle amount. The input manager should convert the 4 boolean values into a throttle percentage that the vehicle developer can easily consume. As additional input managers are created, abstracting away the hardware specific details like this will make the life much easier compared to trying to emulate the 4 booleans with new hardware that now uses a slider control.

Vehicle Controller:

The vehicle controller is responsible for relaying input from the active input manager to the proper components of the vehicle. For example, relaying the throttle amount to the engine script, or applying a brake force to the wheels when the parking brake is on. Transmission Controller—The transmission controller is responsible for handling transmission shifting, neutralization, gear selection, etc. This could possibly be made into a shared, generic class someday, offloading some of the vehicle specific logic to the vehicle controller, but at this point, it has been easiest to develop custom controllers on a per product basis. Apply the scripts to the vehicle—Assign the vehicle controller and input manager onto the root game object of the prefab.

Dynamic Terrain Documentation:

The following describes the algorithms and concepts used by the control system 22 to use the dynamic terrain plugin and it also describes how to setup various dynamic terrain objects within the virtual environment 24 that may be influenced by the simulated heavy equipment vehicle 26.

Overview of Heightmap Based Terrain Concepts:

The terrains in our simulation use a grid of height data to create a heightmap geometry. This geometry is generated by placing vertices in a predefined grid on the X (right) and Z (forward) axes and using height data on the Y (up) axis to shape the height field. For efficiency, the control system 22 uses cuboid volume calculations when determining how much material a height change represents (sample spacing X*sample spacing Z*height).

Digging Resistance:

Digging resistance is applied to the machine by creating joints that use damping forces to drive towards a zero velocity. Damping forces are determined by multiplying the depth of the implement against a pre-defined resistance curve. Low density material applies less resistance force than high density material by using a predefined fractional multiplier: Force=Curve.Evaluate(HighDensityDepth+LowDensityDepth*LowDensityModifier).

Figure 17:
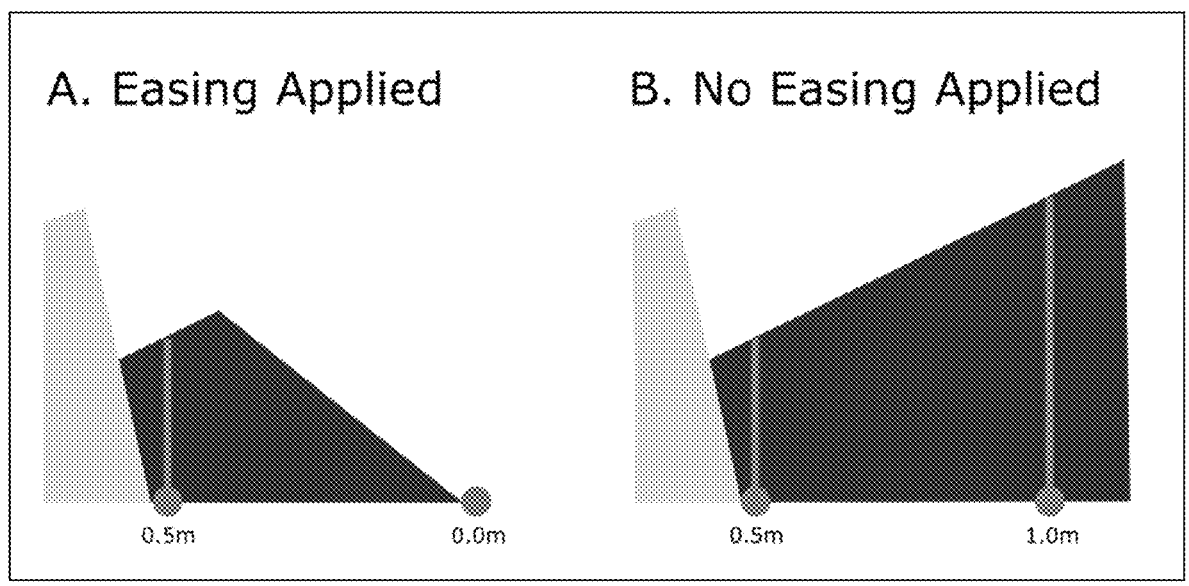

Resistance Easing:

Resistance easing is the process of looking ahead of the implement to check depths and reduce resistance based on how much lower the further out material is. This is useful for example, when pushing through a berm (A.) which should not apply as much resistance as pushing into the side of a hill (B.), as shown in FIG. 17.

Erosion:

Erosion is handled by comparing two height samples against each other, in the direction of an applied acceleration, while considering start/target angles of repose that define when erosion should begin and to what angle the erosion should result in. The angles supplied are the values used under normal gravitational acceleration (9.81 m/s2), however, changes in the acceleration vector will affect the actual angles used. Erosion is handled efficiently by creating a maximum deviation grid that is computed in the local frame of the heightmap being eroded. The control system 22 computes the height threshold that the 4 samples around a particular sample must be above or else erosion of the current sample will be triggered. These computed values define the maximum deviation grid, and the control system 22 uses this grid to compute once and compare many times against each sample in the heightmap.

Heightmap Supported Areas:

Heightmap supported areas are oriented bounding boxes that prevent material from eroding into them. When comparing a sample to the deviation grid, if the adjacent sample is in a heightmap supported area, erosion will not be triggered in that direction. This is useful when it is desired to have the edge of a blade to prevent a berm from eroding into the blade, for example.

Material Density Effects:

Erosion is currently applied only to low density materials. The exclusion of high density materials allows operators to create steep edges when cutting through packed material.

System Components:

In some embodiments, the control system 22 includes the following system components:

1) TerrainManger:

The TerrainManager provides developers with singleton access to the terrain systems, generating filtered TerrainInfo objects based on the criteria that the calling code sets. The control system 22 will need to add a TerrainManager into the scene to make use of the dynamic terrain plugin.

2) DynamicTerrain:

The DynamicTerrain class defines a terrain object to be used by the terrain manager. The DynamicTerrain may include a grid of objects that the control system 22 will need to treat as a single terrain and will handle stitching the changes across all objects. The DynamicTerrain is also responsible for telling its children when to apply cached changes. The control system 22 caches changes rather than applying them immediately because changing geometry is expensive, so it is desired to do it once per frame.

Figure 18:
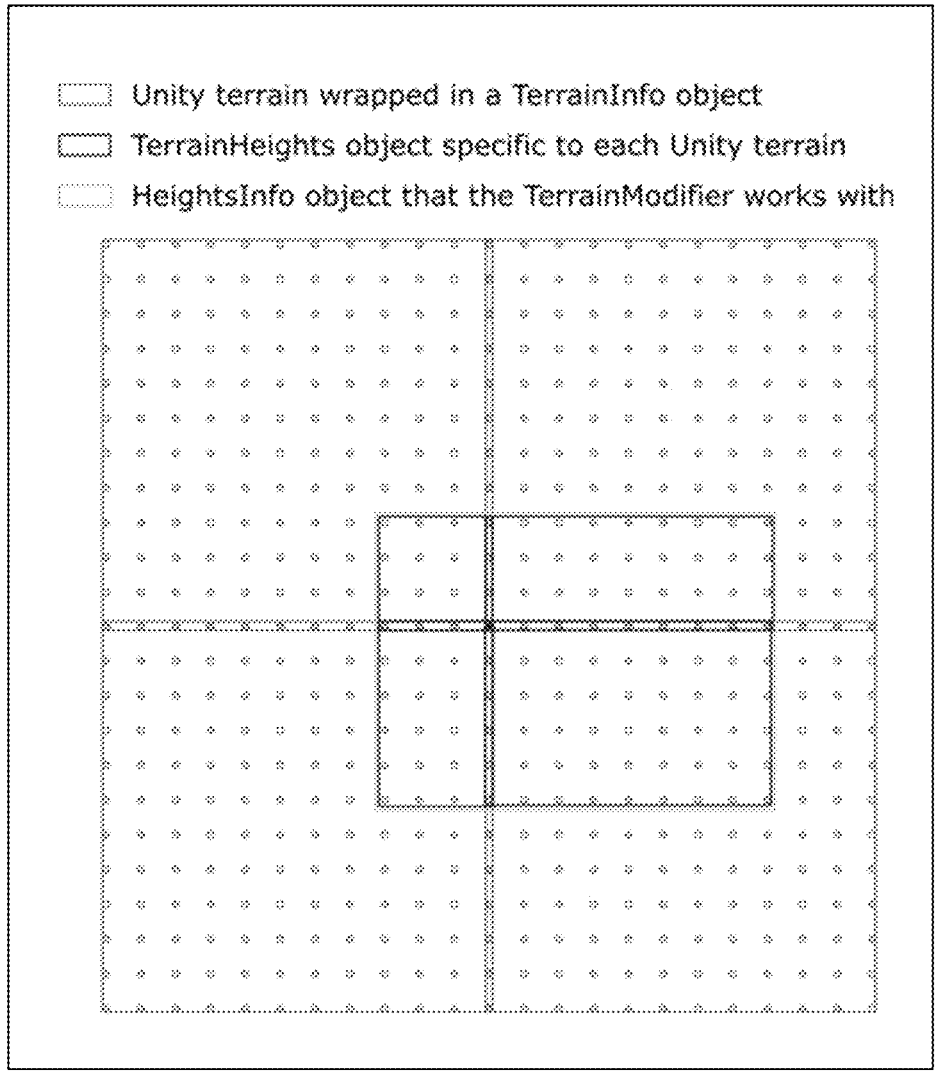

3) HeightsInfo Objects:

HeightsInfo exists to hide the complexity of working across multiple terrains by presenting the developer with a single heightmap that fits the requested working area (as shown in FIG. 18). The HeightsInfo object is supported by a number of underlying classes that give access to the terrains that the HeightsInfo might affect. TerrainInfo objects. The TerrainInfo object contains data for an entire, single heightmap. That heightmap could be a Unity terrain, a DirtHeightMap, a MoundHeightMap, or any heightmap that has a corresponding implementation of a TerrainInfo (See UnityTerrainInfo.cs, MoundHeightmapTerrainInfo.cs, DirtHeightmapTerrainInfo.cs). These specific TerrainInfo implementations are responsible for caching and applying changes to the heightmap that it represents. TerrainHeights Objects. A terrain heights object is a generic subsection of the heightmap exposed through the TerrainInfo objects. This subsection allows the developer to work with smaller arrays of height data that better fit the area that they are trying to modify. When working across multiple terrains, the HeightsInfo object that the control system 22 retrieves from the TerrainManager may contain multiple TerrainHeights objects. However, the HeightsInfo manages applying the changes to the correct TerrainHeights object.

4) Terrain Modifier Objects:

Terrain modifiers are used to modify the terrain and report terrain changes to a listening component (for example, a BucketController that may want to add the modified volume into a DirtHeightMap inside of the bucket). Currently, the control system 22 supports 2 types of terrain modifiers: TerrainModifierScript—this is a basic terrain modifier that uses an oriented bounding box to determine which samples in a height map are inside of the bounds, and it then lowers those samples to move them towards the edge of the bounds; ColliderTerrainModifier—the ColliderTerrainModifier uses raycasts to find where the sample lies relative to its child colliders. The resulting contact point (assuming the raycast hits a collider) is then used to lower the sample.

5) DepthSamplers:

Depth samplers are used to determine how deep into the ground a certain point is. Depths are returned as an array of depths representing different layers of material and the depth in each. At the moment, only 2 layers are supported; low density (loose) and high density (packed) material. The system is designed for future expansion into any number of layers.

Creating an environment with a Unity terrain:

In some embodiments, the control system 22 is configured to allow users to set up a virtual environment for use with a dynamic terrain. The following algorithm steps are executed by the control system 22:

Create an empty game object in the scene and name it TerrainManager. Add a TerrainManager component to the new object. If only using a single terrain: create a Unity terrain and add a DynamicTerrain object to the terrain. If more than one terrain stitched together and behaving like a single terrain: terrains must be the same resolution and aligned in a nice checkerboard pattern; create an empty game object named DynamicTerrain and add a DynamicTerrain component to it; assign all the terrain objects as children of the DynamicTerrain game object in the hierarchy.

Resize terrain to have an acceptable sample density. Add 2 textures to the terrain (by default, the second texture is used for areas of digging, but can be changed on the TerrainManager component). Flatten the terrain with some height. A default terrain as created cannot be lowered. It must have height added using either brushes or the flatten feature in order to allow for digging. Be sure to give enough height to allow sufficient digging for the application. If the terrain is lowered back down to its pivot, the samples cannot go any lower. Add a Box to the scene and place a ColliderTerrainModifier component onto it. Press play and drag the box through the terrain in the editor. It should dig out the terrain wherever it goes.

Figure 19:
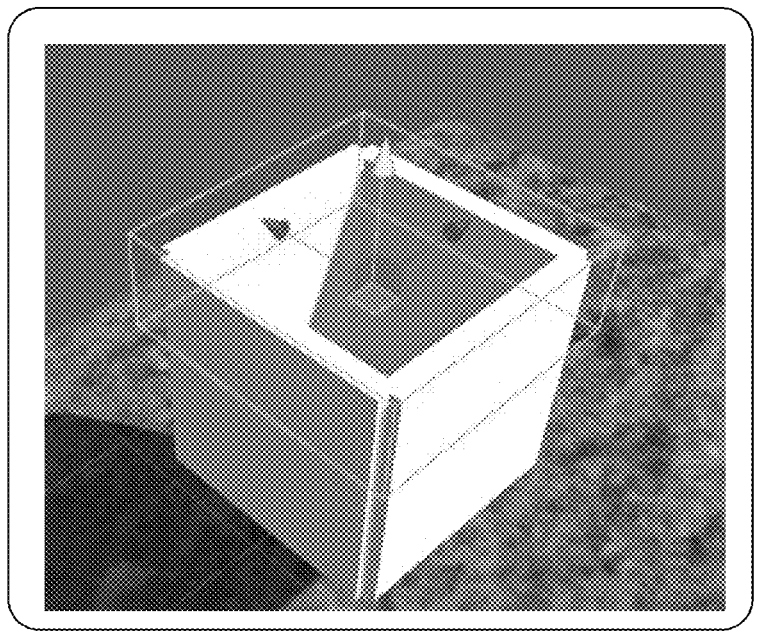

Setting a Bucket Up for Digging:

Once the control system 22 has the bucket geometry created and imported into the simulation, the control system 22 can begin adding the components required to make it dig. First, make sure the bucket colliders are in a proper collision group (probably "Implement"). Add a child game object named "TerrainModifier" to the bucket. Add a TerrainModifierScript to this new object and adjust the oriented bounds to encompass the cutting edge and the opening of the bucket (see FIG. 19).

Figure 20:
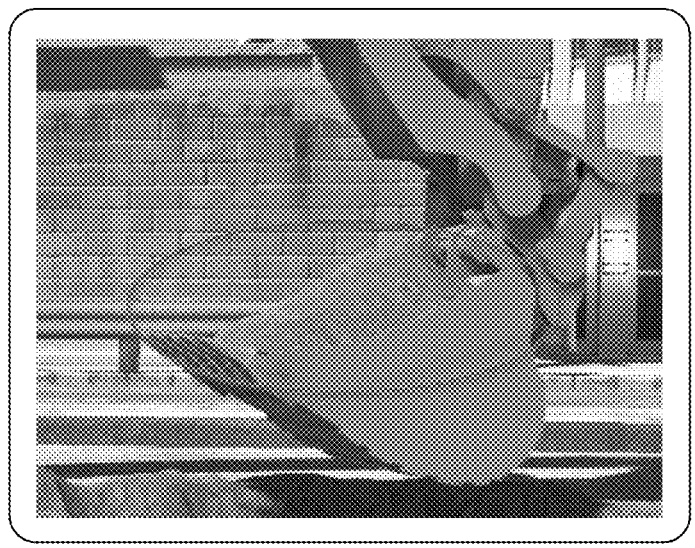
Figure 21:
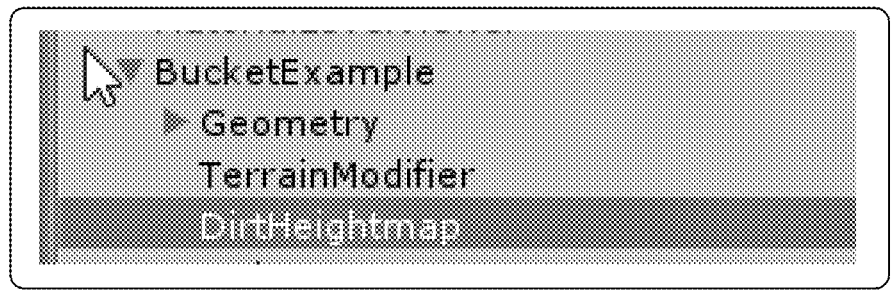

Using the DirtHeightmap component:

The DirtHeightmap class is used to represent a miniature terrain that ban be positioned and rotated in any fashion in the environment. DirtHeightmaps are often used in conjunction with an ErodeAndSpawn component so the material can spawn TerrainEntities to transfer material. This type of terrain is useful for representing a pile of dirt in a bucket or in a truck bed (see FIG. 20). To create a DirtHeightmap, add a new, empty game object underneath the bucket in the hierarchy named "DirtHeightmap", as shown in FIG. 21.

Figure 22:
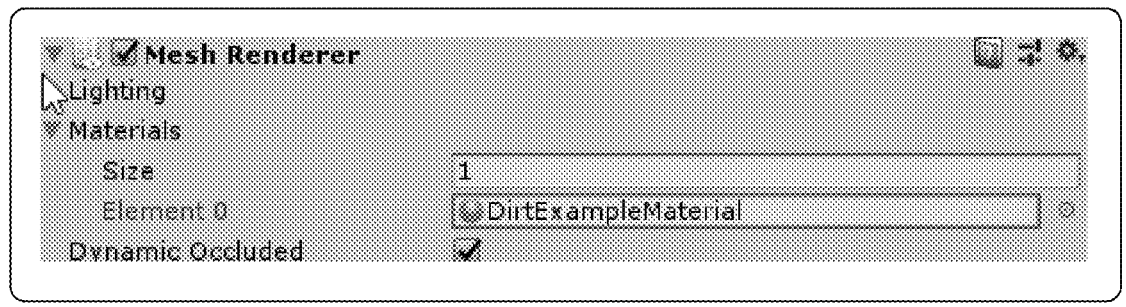

Assign a DirtHeightmap component to the new game object and set the "Shrink Wrap Layer" to the same collision layer as the bucket. This tells the DirtHeightmap to raycast and find where the bottom of the bucket is. It allows the mesh to hide when there is no material. Assign a dirt material to the MeshRenderer on the DirtHeightmap, as shown in FIG. 22.

Figure 23:
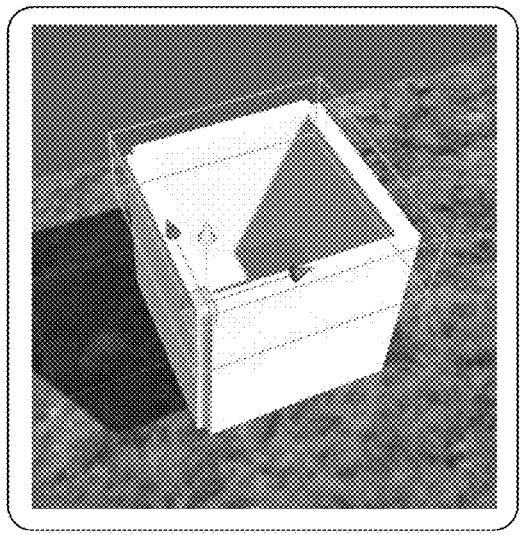

Add a DynamicTerrain component to the DirtHeightmap game object. As shown in FIG. 23, move the heightmap to the lower left corner of the bucket opening as pictured below and position it just above the colliders that shrink wrap against.

Figure 24:
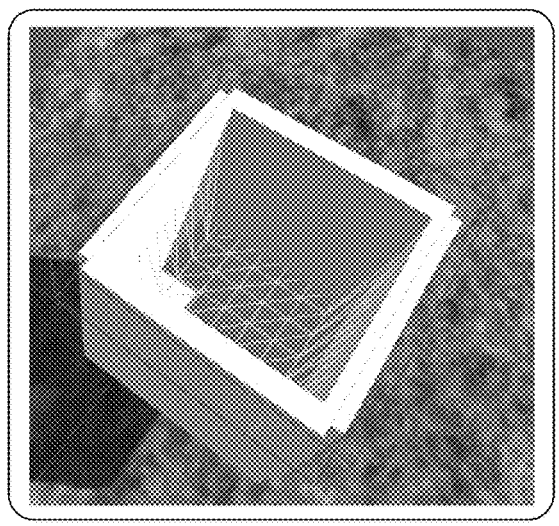

Adjust the heightmap resolution, width, and length to match the bucket's opening dimensions. When the control system 22 runs, with the DirtHeightmap selected, the control system 22 should be able to see the physics collider of the heightmap to give a sense of how it fits to the bucket, as shown in FIG. 24.

Figure 25:
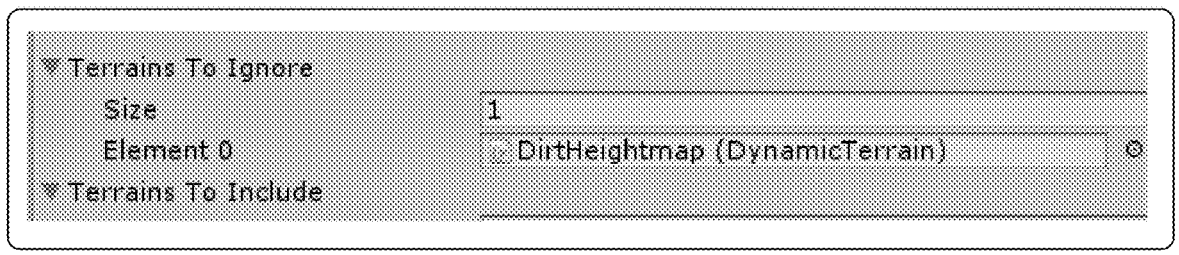
Figure 27:

Add the Heightmap into the TerrainModifiers "Terrains to Ignore" list. This prevents the bucket's terrain modifier from digging out the DirtHeightmap material, as shown in FIG. 25. Add a BucketController that hooks into the TerrainModifier's OnModify( ) callback to add material to the DirtHeightmap.

Setting a Blade Up for Digging:

Create an empty child on the blade named TerrainModifier and assign a TerrainModifier component. Adjust the OrientedBoundingBox of the TerrainModifier to represent where to modify the Terrain in front of the blade. Add a MoundHeightmapController onto the blade to spawn and control the mound.

Create a mound prefab to represent moving material:

Add the DirtRemeshing and DynamicTerrain components to the mound prefab. Create an empty child named Moundheightmap and add the MoundHeightmap component. This game object will need to be offset on X by half of the mound width as the mound will be drawn to the right of the pivot. Assign a material to the MoundHeightmap MeshRenderer. Add an empty child to the prefab named BladeEdgeTracker. This object will be continuously positioned to be right at the edge of the blade. Add an empty child to the BladeEdgeTracker named SeparationPlane and move the game object so that the X/Z plane is in line with the cutting edge of the blade (this defines where the mound and the terrain underneath it are divided). Note: The terrain modifier must be above separation plane or the control system 22 will constantly dig and fill the area in between, creating a bubbling effect. Assign the BladeEdgeTracker and the SeparationPlane to the MoundHeightmap component. Add HeightmapSupportedAreas as children of the BladeEdgeTracker for the left and right side of the blade if needed (e.g. if the blade has side walls to help carry material). Add a HeightmapSupportedArea as a child of the MoundHeightmap object and set its bounding box to be just inside the bounds of the mound. Assign the MoundHeightmap into the "Terrains to ignore" list of this HeightmapSupportedArea. This will prevent windrows from eroding into the mound. Add an ErodeAndRaise component to the MoundHeightmap. Finally, apply to the prefab and assign the prefab to the MoundHeightmapController.

In some embodiments, the control system 22 includes simulation software for Level I simulators for the Heavy Equipment Training Simulators which will train commercial users in the tasks associated with the operation and maneuverability of the equipment. The simulator system 10 will replicate the functions and actions of a heavy equipment Machine Model to train commercial users on the basic principles of operating the equipment to include locations and functions of controls and instruments. The simulator system 10 is used to teach the basic skills required to operate and maneuver the equipment, emphasizing efficient performance and safety. The simulator system 10 will include the standard commercial operator seat 28, controls for that heavy equipment Machine Model 30, computer system 54, 42 inch LCD HD TV monitor(s) display(s) 38, and a head mounted display unit 20.

In some embodiments, the simulator system 10 contains the following key features:

a) Caterpillar Controls 34: Controls from actual machine are designed for the simulator pod(s) and provide realistic interface for controlling, operating and maneuvering the machine. All controls send Pulse-Width Modulation (PWM), Button, or Controller Area Network (CAN) signals to a proprietary controller that interprets the machine signals and converts them into CAN messages to transport over a small network and back to the PC via a Universal Serial Bus through DirectInput. The controller configuration allows for various dynamic control configurations for multiple heavy equipment machines.

b) Operator Tasks: Operating techniques and procedures are practiced with real-world activities as described in the training lessons.

c) Scoring: The score in each lesson is generated based on time, productivity, equipment damage (number of contacts with objects), and exercise success. The simulator system 10 tracks/reports numerous metrics and generates student scores based on performance measures being recorded with the "final score" for a lesson being expressed in terms of exercise success as well as reporting of performance measures and metrics.

d) Safety: The control system 22 emphasizes safety while operating the equipment to increase the Student's knowledge level and awareness of jobsite safety. The simulator system 10 tracks numerous safety violations during training lessons. Any time a safety violation is detected, a message will be displayed indicating the type of violation and any other relevant information.

e) Real-time Feedback: The control system 22 provides real-time feedback to the Student when mistakes are made and potential hazards are encountered.

f) Practice and Assessment Modes: The control system 22 operates in the following modes: Practice Mode with help: Help functionality-Three icons will be displayed on the left side of the screen. Two inactive and one active. Two inactive icons will be displayed in black & white and the Active will be displayed in full color. The inactive icons are 100×100 and the active 120×120. After a predefined period of amount of time (this is set in SimU Campus™), without completion of objective graphical help will be displayed at the lower, left of the screen (keeping text at a minimum). Procedure icons will be the official International Organization for Standardization™ (ISO) icons. The Help Icon will be the actual control image with arrows indicating proper direction of action. There will always be general instruction feed displaying across the bottom of the screen. These are step by step instructions to assist the user with properly and safely using the machine to complete the necessary exercise tasks. User will not receive a permanent score during practice mode, but the exercise metrics will be graded against the exam mode criteria. Assessment Mode or Exam Mode: No Help functionality. There will be high level section instructions to assist with the flow of the exercise. These will be displayed across the bottom of the screen. User's score from each exercise ran will be retained within the SimU Campus™ Training Management software.

g) Realistic Virtual Environment: The system's realistic virtual environment 24 includes high fidelity visual system, depth cues and audio cues associated with the actual equipment and other equipment and objects in the jobsite.

h) Machine Performance: Modeling is based on the actual equipment performance data providing realistic response to the student and interaction with the environment.

i) Languages. The software interface and performance statistics will be available in English as well as customer defined foreign languages.

j) Camera Views. The simulator system 10 allows the user to change the view by clicking the mouse for various views which include the following: 1) In Cab View: User will have the ability to move the camera around as though they were moving their head in cab by using the mouse. Camera movements with the mouse will include: Position (X, Y). 2) Outside Cab View: User will have the ability to navigate the entire area around the machine through the orbit camera. The camera will integrate the mouse controls to assist with navigation. Mouse Wheel will allow the user to zoom in/out. Moving the mouse will navigate the orbit camera in free space within the virtual environment. The orbit camera will limit the user to stay above the terrain when navigating around with the camera.

k) Training Manager. The simulator software must work with the SimU Campus™ Training Manager Software. The simulator software must accept a parameter(s) to tell what mission to start, what map to start, whether to start in practice mode or assessment mode, and various other parameters set through SimU Campus™ Training Manager Software.

Operator's Seat: The operator's seat 28 and the console has a variety of adjustments in order to meet a wide range of Operator's needs. Adjustable Seat—The seat will have the ability to be adjusted by the user for best positioning, and comfort during training. The seat can adjust in the following manner: Forward/Back; Recline Forward/Back; Headrest Raise/Lower. Safety Belt—The seat will be equipped with a Safety Belt, which will be connected to an electrical switch that will toggle a signal in the software to indicate when the user has the belt fastened or not.

Training Exercises: 1) Walkaround; 2) Controls Familiarization; 3) Open Training; 4) Besides above standards, varies by machine model.

Exercise Passing: When a user operators the machine through the entire exercise and completes the necessary tasks the simulation will pass the user. "Passing" in this situation does NOT mean the user has completed the necessary tasks within the allotted ranges setup by the expert data within SimU Campus™ Training Records Management software. Once the user makes it to the end of the exercise and shuts the machine down the following should always happen. Once the simulation reaches the completion point (Key Off machine) all controls will be locked out. Not user input through the controls will be recognized or cause any response within the simulation. The simulation will display "Exercise Complete!" text at the bottom of the screen. The text will display in a green color. The screen will fade from color display to black and white display over the course of 15 seconds before completely shutting down. The simulation will write the exercise metrics and data to an XML file for SimU Campus™ Training Records Management software to display within a report (shown in FIG. 26).

Exercise Failure: When a user operates the machine in an unsafe manner, fails to adhere to exercise instructions or various other incorrect actions, the simulation exercise could fail the user. In the event of exercise failure the following should always happen. Once the simulation reaches a failure state all controls will be locked out. No user input through controls will be recognized or cause any response within the simulation. The simulation will display the failure reason at the bottom of the screen. Text will be displayed as, "FAILURE: [InstructionString]" or "FAILURE: [FailureReason]": Where [InstructionString] is the current instruction; Where [FailureReason] is the explanation for cause of failure. The Text will display in a red color. Normal exercise completion routine will commence, but instead of "Exercise Complete!" it will display the Failure information until the simulation closes. The screen will fade from color display to black and white display over the course of 15 seconds before completely shutting down. The simulation will write the exercise metrics, data and failure information to an XML file for SimU Campus™ Training Records Management software to display within a report.

Warning System: The warning system is designed to help inform the user of incorrect actions, unsafe practices, etc. so the user has a better understanding of proper machine operation and what is considered incorrect or unsafe. The warning system also helps the simulation keep the user on-track with the necessary exercise steps and procedures. If multiple warnings are present in the system, the most important problem is shown first (the warnings spreadsheet will have warning levels please refer to it for more detail).

WarningTimer—parameter defined in the configuration file to set the amount of time between when an instruction is displayed until the simulation starts warning the user for NOT completing the instruction, Default WarningTimer value is 20 seconds.

FailureTimer—parameter defined in the configuration file to set the amount of time between when an instruction is moved to a warning and when the simulation fails the user for NOT completing the instruction, Default FailureTimer value is 15 seconds.

When any exercise loads the warning system will be enabled and will display warning information through the exercise if certain criteria are not met. Some warnings will be displayed ONLY in practice mode.

Ignoring Instructions Warnings—these warnings are designed to inform the user that they are not following proper procedures displayed on the screen. If an instruction is displayed in practice mode, a timer is started once the instruction is displayed and the instruction will display for the amount of time defined in the WarningTimer parameter. If the instruction is NOT completed by the user after the defined WarningTimer period then the instruction will turn into a warning: Text will be displayed as, "WARNING: [InstructionString]", Where [InstructionString] is the current instruction. The Text will change colors from Yellow to Red based on the elapsed time. Yellow text is displayed when the warning text is first displayed. Red text would be displayed when the system reaches the FailureTimer value with an instructional warning. If the instruction is NOT completed by the user after the defined FailureTimer period then the instruction will become a failure: Text will be displayed as, "FAILURE: [InstructionString]", Where [InstructionString] is the current instruction. The Text will change to a red color. Normal exercise completion routine will commence, but instead of "Exercise Complete!" it will display the Failure information until the simulation closes. This warning will increment an "Ignoring Instructions" metric each time it is generated.

Exercise Warnings—these warnings will occur when the user is performing actions outside of the intent of the exercise. These warnings include: Get Back On Course warning—If the user drives off course from the desired path during an exercise they will receive this warning. This warning will progress to exercise failure if NOT corrected. Return To Exercise Area warning—If the user drives away from the area required to perform the exercise they will receive this warning. This warning will progress to exercise failure if NOT corrected. Fuel Level Low warning—If the user allows the fuel level to drop less than 10% of the original volume they will receive this warning. This warning is a Level 1 warning and will also cause a warning to display on the Monitor system. Overspeed warning—If the user operates the machine in a fashion that overspeeds the engine they will receive this warning. This warning is a Level 2 warning and will also cause a warning to display on the Monitor System AND the Alert indicator on the Monitor will blink until the situation is corrected. This warning will progress to exercise failure if NOT corrected. Lift Overload warning—If the user attempts to lift more than the machines defined/safe capacity they will receive this warning.

This warning is a Level 3 warning and will also cause a warning to display on the Monitor System AND the Alert indicator on the Monitor will blink AND an audible alarm will sound. This warning will progress to exercise failure if NOT corrected. The warning text will display as, "WARNING: [WarningText]", Where [WarningText] is the defined warning information in the Exercise Warnings.xls spreadsheet. The warning text will change colors from yellow to red based on the elapsed time: Yellow text is displayed when the warning is first displayed. Red text is displayed when the warning has progressed to a failure. Warnings that do NOT progress to failure will just flash in yellow text three times at the bottom of the screen. This warning will increment an "Ignoring Instructions" metric each time one is generated.

Walkaround: This exercise will utilize the Caterpillar Machine Model and review the proper pre-operation walkaround procedures. The user will start at the base of the machine and work their way through the different inspection points per section on the machine. The user will have the ability to navigate between inspection sections using directional arrows. The user will have the ability to either highlight the proper inspection point or have the inspection point highlighted by pointing at the name in a list. At each inspection point a question will be posed to the user relating to the part or inspection point. The user will have the ability to indicate whether the inspection point is faulty or passes inspection. The user will work their way around the machine from base to cab in an organized manner every time the exercise is run. The exercise is complete when all inspection points have been reviewed. The number of faulty points will be defined in the SimU Campus™ Class settings. These faulty points will be determined at random when the exercise is loaded. SimU Campus™ will write the value to the <WalkaroundFaults> configuration parameter when launching the simulation.

The exercise will load and present the pre-exercise instructions/tips screen. The pre-exercise screen will contain an image of the machine in the exercise environment performing the exercise. The pre-exercise screen will contain pertinent exercise information/tips as bullet points next to the image.

This is the first section of the walkaround: Each Section contains a pre-defined number of inspection points. The user can navigate between sections at-will but the entire exercise is NOT complete until they have marked all inspection points. The section's walkaround points will be listed in the upper left corner of the user view. Each inspection point will have a transparent checkmark next to it: Once an inspection point has been reviewed the checkmark will change colors accordingly: Green=successfully indicated the part as good or faulty. When an inspection point is correctly marked the simulation will indicate with a passing sound as well. Red=Incorrectly indicated the part as good or faulty. When an inspection point is incorrectly marked the simulation will indicate with a failure sound as well. If the user hovers the mouse pointer over an inspection point in the list: The text in the list will change color to yellow to indicate a highlight. The corresponding part/inspection point on the machine section will also highlight yellow to assist users who are unfamiliar with the part/inspection point. If the user hovers the mouse pointer over an inspection point on the machine: The text in the list will change color to yellow to indicate a highlight. The corresponding part/inspection point on the machine section will also highlight yellow. Each Section will have navigational arrows on either side of the user view to allow the user to move between sections on the machine. The Left side arrow will move the user to the next inspection section to the left of the current section. The Right side arrow will move the user to the next inspection section to the right of the current section. The navigation will "fly" to certain points on the machine so the user has an up-close view of the inspection points and parts. However, in the real world some of the inspection points are visually inspected from the ground level or the Stick and Boom are lowered in such a manner that the user can be closer to the inspection points.

The walkaround will be divided into Ground Level, Engine/Platform Level, Cab Level inspections. Once all walkaround sections and inspection points have been reviewed the exercise will end. Simulation will display the following message, "Exercise Complete!". Text will display in green color. The simulation message, "Exercise Complete!" will not be affected by the color changing. The simulation will compile the exercise results and output the metrics and data to an XML file in the appropriate location for the reporting tool to use.

Controls Familiarization: This exercise will utilize the Caterpillar Machine Model and review with the user the basic control operations of the machine. The control review will be randomized so that the order is not always known by the user. During this exercise the simulation will display an icon/control image helper system in the lower left corner of the user view. The user will have a set amount of time to perform the requested action by the simulation, and after that time they will fail for not following instructions.

Control Familiarization Helper System: The Control Familiarization Helper System is designed to assist the user becoming familiar with the machine. It will show an icon (from the machine's Caterpillar O&MM manual) as well as the actual control in an image along with the on-screen simulation instructions. This helps give a visual representation of the control to the user. The Helper System will be enabled for both practice and exam modes.

When the control familiarization exercise loads it will randomize the entire exercise and store the listing in memory. This will allow us to display future instructions (as icons) in a list for the user. For each section of the control familiarization the helper system will display at least 3 instructions ahead of icons, if possible, in the lower left corner of the user view. When an instruction displays the icon will be active: The icon coloring will change from Black/White/Grey to Yellow. The icon and instruction will display for 10 seconds allowing the user to properly perform the requested action. If an action is performed: If the action performed is the correct action: The simulation will make a correct action sound. The helper system will move (animate/flip) to the next icon along with the simulation system's on-screen instruction text. If the action performed is NOT the correct action: The helper system will remain as is and the 10 second timer started above will continue to count down. The simulation will note an incorrect action metric related to the control being used by the simulation system. If no action is performed after 10 seconds: The icon will animate (flip) to the actual control Image. The Control Image will increase in size from 100×100 to 120×120. The Control Image and instruction will display for 10 seconds allowing the user to properly perform the requested action. If an action is performed: If the action performed is the correct action: The simulation will make a correct action sound. The helper system will move (animate/flip) to the next icon along with the simulation system's on-screen instruction text. If the action performed is NOT the correct action: The helper system will remain as is and the 10 second timer started above will continue to count down. The simulation will note an incorrect action metric related to the control being used by the simulation system. If no action is performed after 10 seconds: The user will fail the exercise for ignoring instructions.

The exercise will load and present the pre-exercise instructions/tips screen. The pre-exercise screen will contain an image of the machine in the exercise environment performing the exercise. The pre-exercise screen will contain pertinent exercise information/tips as bullet points next to the image. The User will be prompted to honk the horn to continue past the screen once the environment has loaded.

Start-up Procedures: Once the world camera orients to the operator view the control reset form will be displayed. Please refer to the Control Reset section of this document for detail. After proper control reset the user will be lead through the proper startup procedures. User will be guided through the Startup Procedures. If at any time the operator fails to perform a step, or if they perform a step incorrectly, they will fail the exercise for incorrect machine startup. The simulation application will pass appropriate failure messages to the reporting tool.

After properly starting the machine the user will begin the exercise procedures: For this exercise the control listing is randomized during the initialization. So, the order of instructions will always be different with the exception of the startup and shutdown sections. The exercise will display control familiarization sections utilizing the helper system defined above. The exercise will follow the same failure system as described above in the helper system.

After going through all controls on the machine (including switches, pedals and lockout) the user will be prompted to shutdown the machine.

Once the machine has been shut down and the key turned to the off position the simulation will begin to shutdown: Simulation will display the following message, "Exercise Complete!". Text will display in green color. The simulation will fade to Black and White. 15 seconds between pressing horn control and final Black and White display. The simulation message, "Exercise Complete!" will not be affected by the color changing. The simulation will compile the exercise results and output the metrics and data to an XML file in the appropriate My Documents location for the reporting tool to use.

Open Training: This exercise will utilize the Caterpillar Machine Model and allow the user to review any skills in the construction environment.

The exercise will load and present the pre-exercise instructions/tips screen. The pre-exercise screen will contain an image of the machine in the exercise environment performing the exercise. The pre-exercise screen will contain pertinent exercise information/tips as bullet points next to the image. The User will be prompted to honk the horn to continue past the screen once the environment has loaded.

Startup Procedures: Once the world camera orients to the operator view the control reset form will be displayed. Please refer to the Control Reset section of this document for detail. After proper control reset the user will be lead through the proper startup procedures. User will be guided through the Startup Procedures. The Startup Procedures will be the same for EVERY exercise. If at any time the operator fails to perform a step, or if they perform a step incorrectly, they will fail the exercise for incorrect machine startup. The simulation application will pass appropriate failure messages to the reporting tool.

After properly starting the machine the user will begin the exercise procedures: For Open Training there are no formal procedures or steps other than starting the machine and practicing safe operating procedures. The Simulation will display the following text, "Open Training—Press ESCAPE To Exit When Finished". The user does NOT have to properly shut down the machine in this exercise. When the user exits the exercise the simulation will compile the exercise results and output the metrics and data to an XML file in the appropriate My Documents location for the reporting tool to use.

Figure 28:
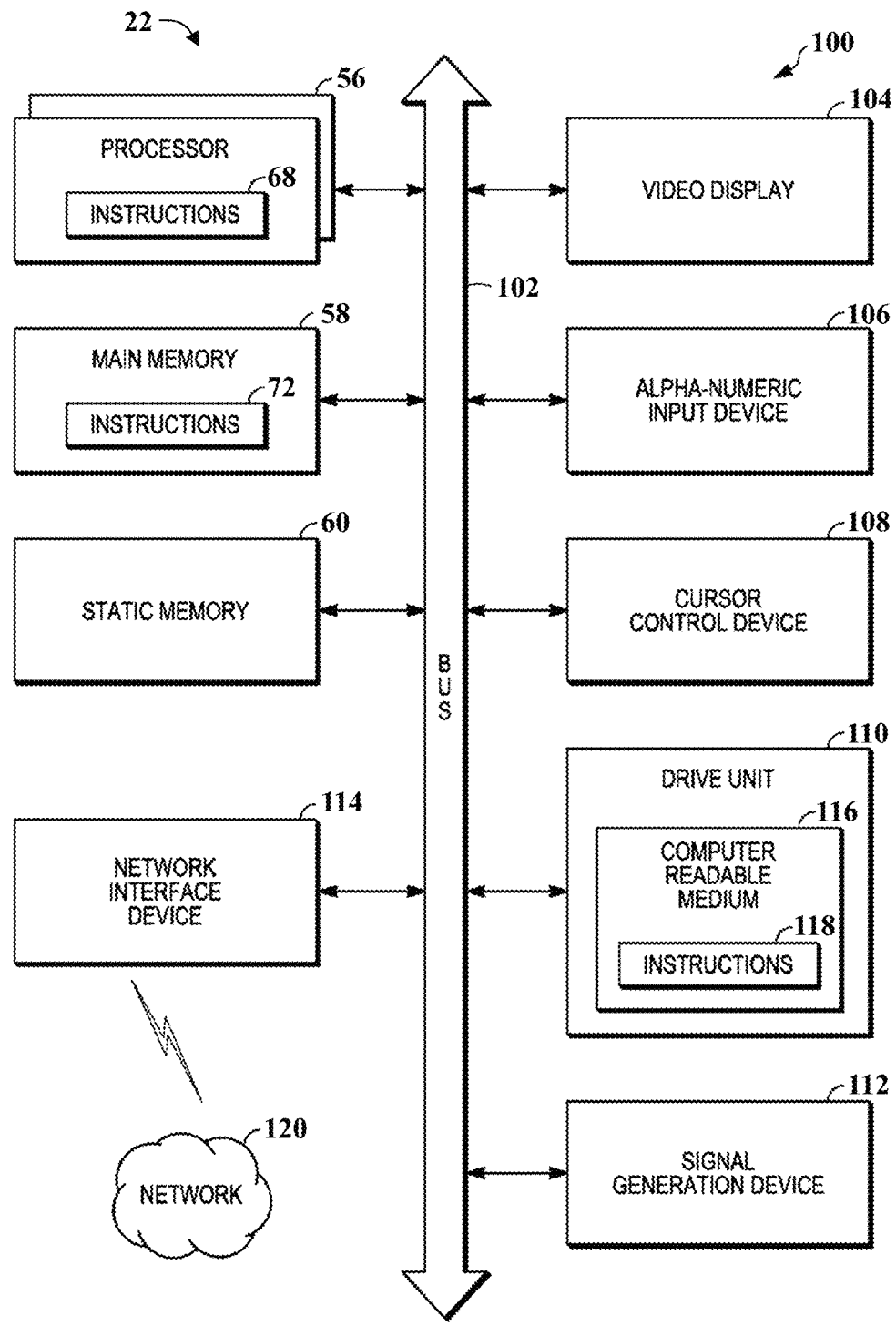
FIG. 28 is another schematic block diagram of a control system that may be used with the heavy equipment simulation system shown FIG. 1.

Referring to FIG. 28, in some embodiments, the control system 22 may include a computer system 100 within which a set of instructions may be executed causing the machine to perform any one or more of the methods, processes, operations, or methodologies discussed herein. In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 56 (e.g., a central processing unit (CPU) a graphics processing unit (GPU) or both), a main memory 58 and a static memory 60, which communicate with each other via a bus 102. The computer system 100 may further include a video display unit 104 (e.g., a liquid crystal display (LCD) or a cathode ray tube (CRT)). The computer system 100 also includes an alphanumeric input device 106 (e.g., a keyboard), a cursor control device 108 (e.g., a mouse), a drive unit 110, a signal generation device 112 (e.g., a speaker) and a network interface device 114.

The drive unit 110 includes a machine-readable medium 116 on which is stored one or more sets of instructions (e.g., software 118) embodying any one or more of the methodologies or functions described herein. The software 118 may also reside, completely or at least partially, within the main memory 58 and/or within the processor 56 during execution thereof by the computer system 100, the main memory 58 and the processor 56 also constituting machine-readable media. The software 118 may further be transmitted or received over a network 120 via the network interface device 114.

FIGS. 29-33 are flow charts of methods 200, 300, 400, 500, and 600 illustrating algorithms that may be executed by the control system 22 to operate the heavy equipment simulation system 10. The methods include a plurality of steps. Each method step may be performed independently of, or in combination with, other method steps. Portions of the methods may be performed by any one of, or any combination of, the components of the control system 22 and/or the heavy equipment simulation system 10.

Figure 29:
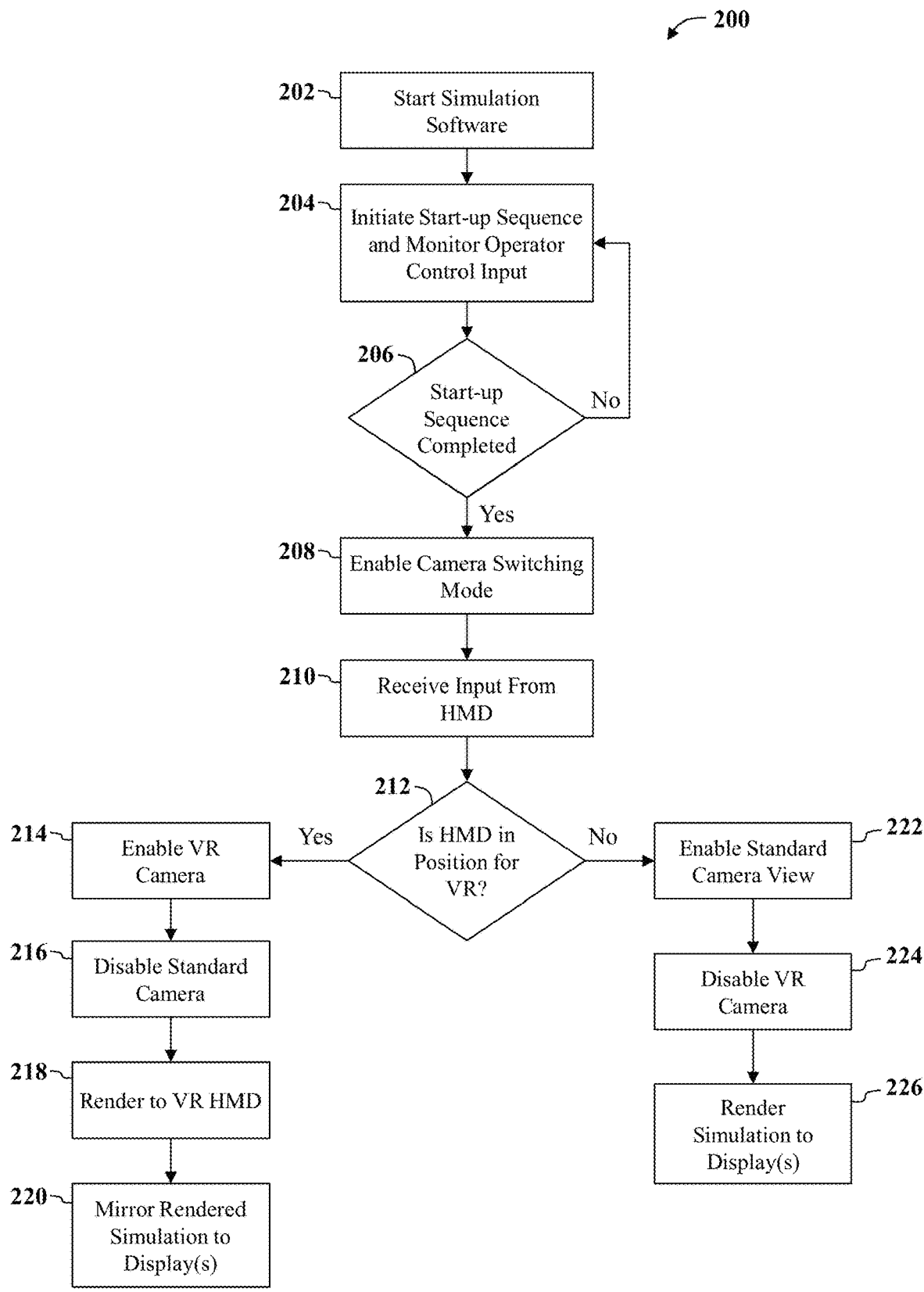
FIGS. 29-33 are flowcharts illustrating various algorithms that may be executed by the control system for operating the heavy equipment simulation system, according to embodiments of the present invention.

Referring to FIG. 29, in method step 202, the processor 56 executes the simulation software to initiate a training simulation using the simulated heavy equipment vehicle 26 within the virtual environment 24 upon receiving a user start-up input signal from the user via the heavy equipment vehicle control assembly 30.

In method step 204, the processor 56 initially operates in the non-VR mode when initiating the training simulation and only renders the virtual environment on the display device assembly 18. The processor 56 then initiates a start-up sequence that requires the user to perform a sequence of control inputs using the heavy equipment vehicle control assembly 30.

In method step 206, the processor 56 determines whether the user has completed the start-up sequence using the heavy equipment vehicle control assembly 30. If the user has not completed the start-up sequence, the processor 56 may display a notification message on the display device assembly 18 guiding the user through the remaining control inputs required to complete the start-up sequence.

In method step 208, upon determining that the start-up sequence has been completed, the processor 56 enables a camera switching mode and establishes the VR camera viewpoint location and the non-VR camera viewpoint location. In one embodiment, the processor 56 is programmed to switch operation from the non-VR mode to the VR mode upon determining completion of the start-up sequence by the user and determining the VR headset unit is being worn by the user.

In method steps 210 and 212, the processor 56 receives input from the VR headset unit 20, and determines whether the VR headset unit 20 is being worn by the user and is in position for operating the VR mode.

In method steps 214-220, upon determining the VR headset unit 20 is being worn by the user, the processor 56 renders the training simulation in the VR mode by enabling the VR camera viewpoint of the virtual environment 24, disabling the non-VR camera viewpoint, and simultaneously rendering the VR camera viewpoint on the VR head mounted display 42 and the display device assembly 18. The processor 56 may also switch from operating in the VR mode to operating the non-VR mode upon detecting the VR headset unit 20 has been removed from the head of the user.

In method steps 222-226, upon determining the VR headset unit 20 is not being worn by the user, the processor 56 renders the training simulation in the non-VR mode by enabling the non-VR camera viewpoint of the virtual environment 24, disabling the VR camera viewpoint; and rendering the non-VR camera viewpoint on the display device assembly 18.

Figure 30:
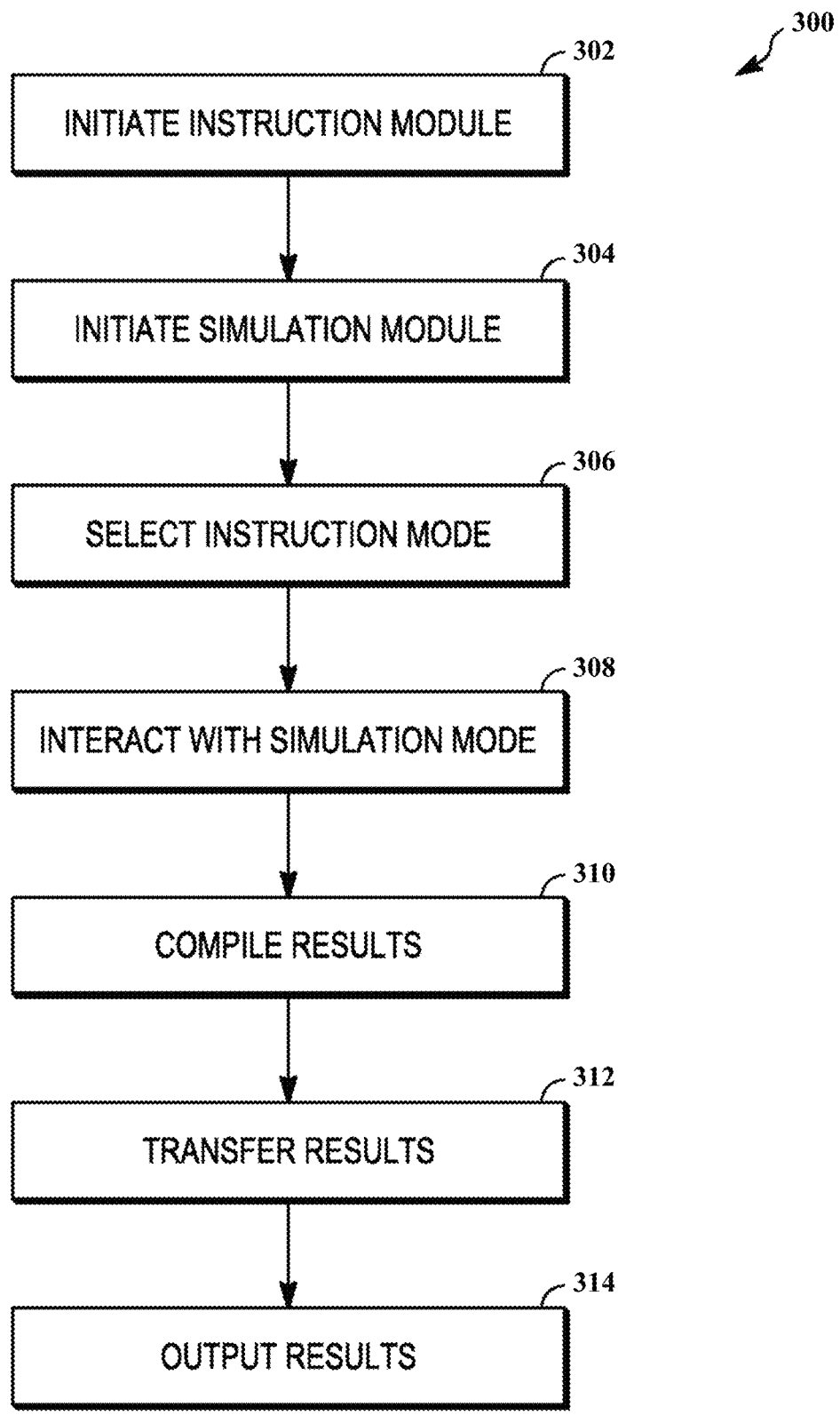

Referring to FIG. 30, method 300 of training an operator is shown, according to some embodiments. An instruction module is optionally initiated 302 by an operator (i.e., student or user) or an instructor. A simulation module 304 is then optionally initiated. One or more instruction modes are optionally selected 306. The operator interacts 308 with one or more simulation modes of a heavy equipment or machine simulator. The operator is evaluated using criteria substantially similar to an original equipment manufacturer (OEM) criteria for a non-simulated heavy equipment model. The results are then optionally compiled 310 and optionally transferred 312 to the instruction module. The results are then optionally output 314 as a visual display, print out or both.

Initiating a module can be performed by an instructor or operator. The simulator allows for an instructor to build a custom exercise program. The program can simulate equipment failure and incident response, for example. In the instruction module, the instructor can select safety procedures, operational exercises and operational and equipment parameters (e.g., engine speed). The instructor can be near the simulator or interacting with the instruction module remotely, such as through a remote input device. Examples of remote input devices include smart phone, tablet computer, and/or laptop computer.

Initiating the simulation module 304 can be done remotely or at the simulator. The one or more instruction modes can be selected by either the instructor or student. Instruction modes include at least a practice mode and exam/assessment mode or operational mode. The practice mode includes help functionality not present in the assessment mode. One example of the help mode includes a graphical control icon that appears on the display after a set time has elapsed without completing an exercise goal. The help mode may include instruction feed text on the display, such as on the bottom of the display. The practice mode optionally does not score a user, but can be graded against the exam mode criteria.

If in exam mode or scored in practice mode, results are compiled 310 either at the simulator or remotely (e.g., wirelessly transmitted to a remote device or computer). In the assessment mode, there may be section instructions to assist with the flow of the exercise. These can be displayed across a portion of a display screen. The instruction module accepts one or more parameters to indicate what exercise to start, what map to start, whether to start in practice mode or assessment mode, and various other parameters set through instruction module by an instructor or user.

The operator (i.e., student or user) interacts 308 with one or more simulation modes, such as simulation exercises. Interacting 308 includes performing one or more simulated exercises substantially similar to an OEM exercise for the non-simulated heavy equipment model. For example, the specific exercises that an OEM designates for training an operator on a "real world" machine are substantially simulated within the simulator. Further, the evaluation and criteria by which the operator is judged in the simulation substantially or exactly mimics the criteria used to evaluate "real world" operators of non-simulated machines or heavy equipment.

Examples of training exercises include walkaround, controls familiarization, bucket placement, "raking the green", "over the moon", loading & off loading the machine from a trailer, trenching, truck loading, bench loading, setting trench box and pipe, backfilling, production cycle, quick coupler and open training.

Before simulating operating tasks, pre-operation tasks can be simulated.

Examples of pre-operation tasks include control reset, startup procedures, safe machine operation, and shutdown procedures. Control reset checks include making sure all controls are in the proper position prior to starting the machine (e.g., on/off key position, hydraulic lock lever position, fine swing control on/off, etc.). A horn signal may be used to indicate all controls are set properly. A user cannot pass this check if controls are not set properly (regardless of horn activation).

The controls familiarization exercise can utilize the machine and review the basic control operations of the machine. The control review can be randomized so that the order is not always known by the user. During this exercise the simulation can display an icon/control image helper system in the lower left corner of the user view. The user can have a set amount of time to perform the requested action by the simulation, and after that time they can fail for not following instructions.

Startup procedures can be prompted by on-screen text or after the control reset exercise is completed. Examples of startup procedure checks include fastening seat belt and warming up machine. Safe machine operations exercise can include such actions carrying implements at a safe distance from the ground, avoiding terrain obstacles, filling containers to appropriate levels, for example. Shutdown procedures exercise requires a user to park on a level surface, reduce engine speed, allow travel levers to return to correct position, and other actions to ensure a safe shutdown and position the machine for a subsequently safe startup.

A warning system can be utilized and is designed to help inform the user of incorrect actions, unsafe practices, etc. so the user has a better understanding of proper machine operation and what is considered incorrect or unsafe. The warning system also helps the simulation keep the user on-track with the necessary exercise steps and procedures. If multiple warnings are present in the system, the most important problem can be shown first.

Audible cues and sounds are implemented during an initial safety walkaround, such as by correctly identifying a non-broken part, correctly identifying a broken part, incorrectly identifying a part as broke, incorrectly identifying a part as non-broken, opening compartment doors, removing and replacing fluid level dipsticks, extracting and retracting the machine seatbelt.

During the simulation there can be an "environment" sound being played. This can provide normal background sounds to a typical construction environment (wind, birds, machines/trucks driving, etc.). On top of the "environment" sound events occurring during the exercise, more sounds can be played. A few examples include operator entry, starting the machine, machine implement slams. Sounds can change during the exercise, such as when changing the engine speed control dial, putting load on the engine, moving the machine implements, etc.

An artificial intelligence (AI) component can be used to simulate on-site directions from a co-worker. The AI component is shown on the user interface as a worker giving hand signals to the operator.

The Camera Helper System is designed to give the user a first person view of specific areas within the simulation that require another view to get the full sense of depth. The Camera Helper System also shows how the Quick Coupler control functions (as far as locking and unlocking the bucket), as well as giving the user a better view of the AI guide when needed. The placement of the Camera Helper can be set in code and cannot be modified through a configuration setting. The placement of the Camera Helper View can be in the lower right corner of the simulation view. This allows easy viewing and keeps the users view of the environment uninterrupted.

When in exercises where the user needs to load a truck, a truck helper camera can be displayed so that the user can easily see where their implement is positioned relative to the truck bed.

During select exercises, a helper camera view can be enabled on one or more of the displays. When the user spots a truck for loading (in both the Truck Loading and Bench Loading exercises, for example) the helper camera system can be enabled When in exercises where the user needs to detach and attach machine implements a helper camera can be displayed so that the user can easily see where their coupler mechanism is located with respect to the implement they are trying to attach. When detaching implements the camera view can show the coupler joint with the implement and how the mechanism unlocks when the user sends certain commands to the machine.

When in exercises where the user needs to be assisted by another operator within the environment to help with object placement, the camera can be displayed so that the user can easily see the signaling operator (AI guide) as they guide the object safely to the final placement location. This camera view can be displayed in both practice and exam mode to assist with the user viewing the AI guide's hand signals.

After interacting with simulation modules 308, the results are then transferred 312 to the instruction module and output 314 onscreen or printed. Results can be output 314 in real-time to instructor, student or both. The results can be transferred 312 within the simulator hardware or via a wireless or cellular signal, for example. The instruction module includes options for sorting and viewing the results. The simulator methods and system emphasizes safety while operating the equipment to increase the student's knowledge level and awareness of jobsite safety. The simulator tracks numerous safety violations during training lessons. Anytime a safety violation is detected, a message can be displayed indicating the type of violation and any other relevant information. The system provides real-time feedback to the student when mistakes are made and potential hazards are encountered.

When a user operates the machine through the entire exercise and completes the necessary tasks the simulation or instructor can pass the user. The score in each lesson can be generated based on time, productivity, equipment damage (number of contacts with external objects), and exercise success. The simulator tracks/reports numerous metrics and generates student scores based on performance measures being recorded with the "final score" for a lesson being expressed in terms of exercise success as well as reporting of performance measures and metrics.

Figure 31:
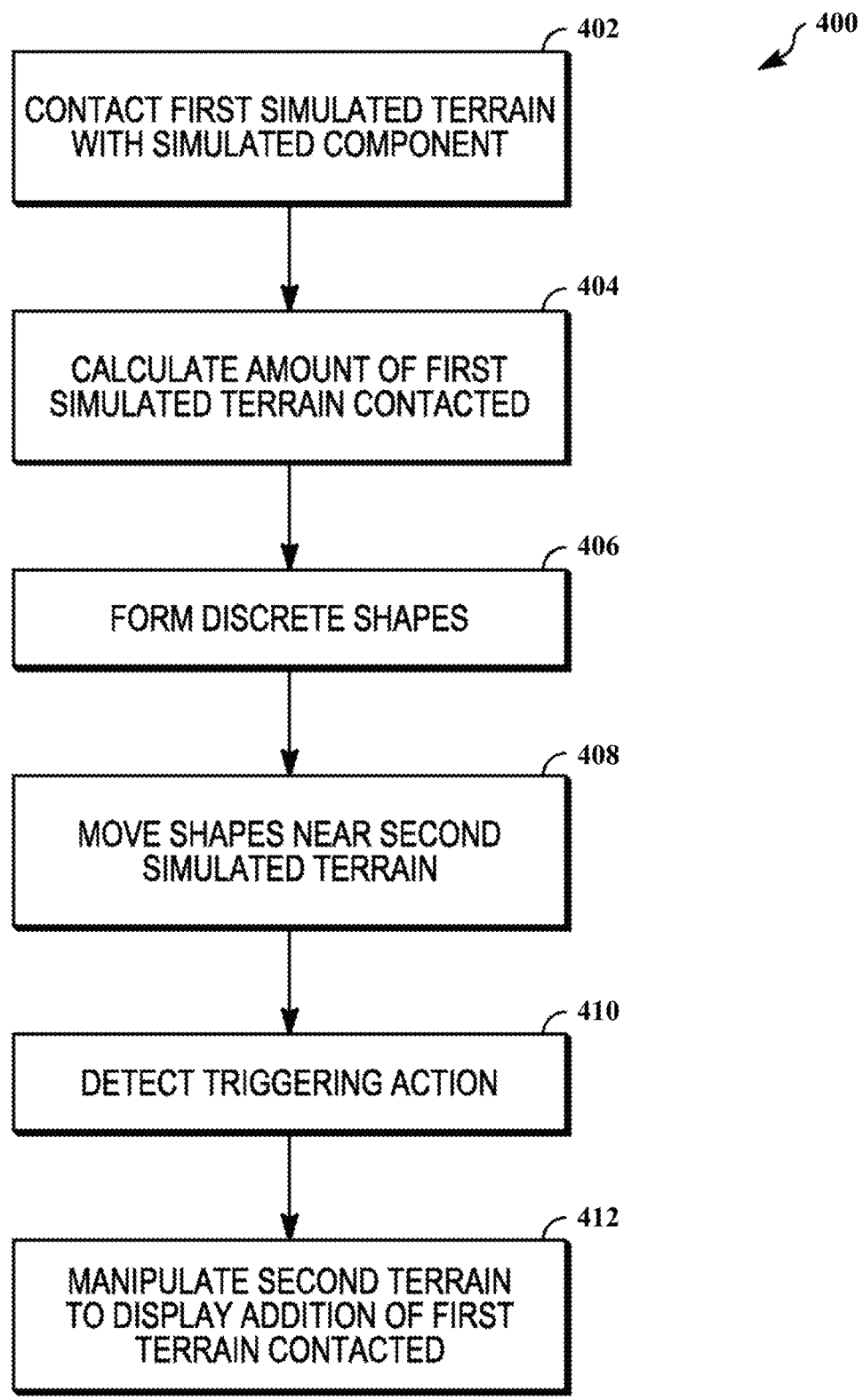

Referring to FIG. 31, method 400 of simulating terrain is shown, according to some embodiment. A first simulated terrain can be contacted 402 with a simulated component. The amount of first simulated terrain contacted is then calculated 404. Discrete shapes of the first simulated terrain contacted are formed 406. The shapes can then be moved 408 within a simulation to within proximity of a second simulated terrain. One or more triggering actions of the first simulated terrain can be detected 410 in respect to the second simulated terrain. The second simulated terrain can be manipulated 412 to visually display an addition of the first simulated terrain contacted.

The first simulated terrain can be editable terrain, such as earth, debris, or other material that may interact with a simulated piece of machinery or equipment. The simulated component, such as an implement of heavy equipment, contacts 402 the first simulated terrain. The implement can be a bucket, blade or other attachment on a vehicle or heavy equipment. Contacting 402 can be digging, pushing, scraping, breaking, grabbing or other motion in which the simulated component and first simulated terrain interact.

Once the first simulated terrain is contacted 402, an amount of first simulated terrain is calculated 404. For example, if a simulated bucket digs a portion of simulated earth from the first simulated terrain, a calculation is made as to the amount dug or interacted with. The calculation may be a volumetric calculation, for example. The first simulated terrain contacted can be formed into discrete shapes 406, such as spheres or irregular shapes that visually represent the terrain being interacted with. The size and number of shapes formed 406 may affect the performance and processing needs of the simulation.

Once the shapes are formed 406, such as dirt clods in a bucket, they can be moved 408 within the simulation to near or within proximity to a second simulated terrain. The second simulated terrain can be positioned in a layer underneath the visual layer of the desired or possible receiving locations (i.e., simulated receiving component) of the first simulated terrain contacted. For example, the second simulated terrain can be positioned underneath the bed of truck or trailer in which the operator of the simulator is directed to place the material or first simulated terrain contacted. The simulated receiving component or receiving location can be one or more of a truck bed, dumpster, trench and trailer.

One or more triggering actions of the first simulated terrain can be detected 410 independently or in respect to the second simulated terrain. For example, the triggering action can be one or more orientations of the first simulated terrain or the simulated component interacting with the terrain, independently or in respect to the position of the second simulated terrain. The triggering action can independently be a certain simulated velocity of the first simulated terrain contacted or simulated component. Once the triggering action is detected 410, the first terrain contacted interacts with the second simulated terrain. For example, at a certain velocity or orientation, the bucket can release the simulated earth into a simulated trailer bed. The second simulated terrain, positioned underneath or integrated with the visual display of the trailer bed then responds or is manipulated 412 to visually display the addition of such material into the bed. The volume or calculated first simulated terrain can be meshed with second simulated terrain and visually display local peaks, piles or generally raise the height of the second simulated terrain to indicate the addition of the material to that simulated location (i.e., the second simulated terrain). The spheres of first simulated terrain contacted are optionally destroyed or smoothed out, according to visual preference within the simulation.

Figure 32:
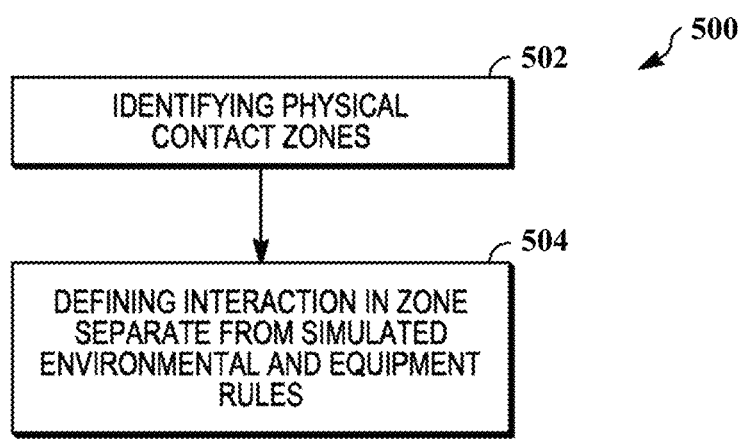

Referring to FIG. 32, method 500 of simulating a physical interaction in a simulator is shown, according to some embodiments. Simulated physical contact zones between two or more simulated objects can be identified 502. One or more interactions in the contact zones can be defined 504 separately from the simulated environmental or equipment object rules. For example, when the environment (i.e., dirt or ground) and a piece of equipment (e.g., bucket) interact, the physical rules for their interaction are defined similar to many types of collisions found written into the software package. An example of physical contact zone includes regions in which objects in the environment are expected to collide or interact. In order to smooth the visual look of the interaction, reduce the resource drain to calculate the physics of the interaction and overall optimize the interaction, the specific zone can be isolated and defined (by rules separate from other interactions in the environment).

In order for equipment interactions to display realistically without significantly affecting performance, virtual contact zones or joints can be created between components. For example, once a component moves into a physical contact zone, real time physics of movement is eliminated or altered and a separate rules system is enacted, such as removing harsh collisions between objects. Such a system allows for smoother, more realistic physical interactions between components on screen, without dragging performance.

Figure 33:
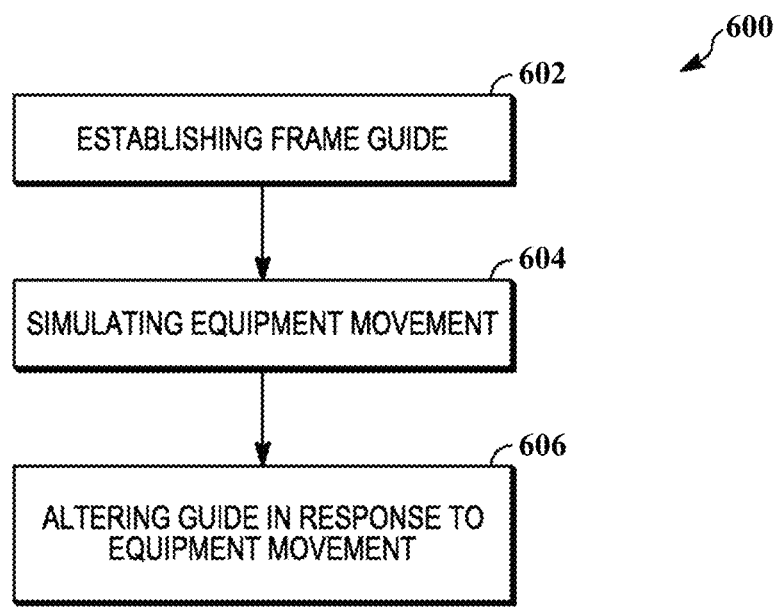

Referring to FIG. 33, method 600 of training an operator of a machine is shown, according to some embodiments. A frame guide for an exercise can be established or formed 602. Movement of one or more pieces of equipment or vehicles can be simulated 604. The frame guide can be altered 606 in response to the movement. The frame guide may be one or more wire frame models showing the proper placement of implements, vehicles or portions of equipment during exercises. As the user moves the equipment towards the proper position, the alteration of the frame guide may include change color, opacity, size, or other visual cue.

The frame guide can be utilized to give the user a visual sense of where their current location of the implement is in relation to the wire frame model they are trying to line up with. The system can calculate a value based on the position (x, y, z) and orientation (yaw, pitch, roll) of the current implement location compared to the predefined location the user is trying to align with. The calculated value can then be translated to a color shader, which can cause the wire frame model to change colors that can help guide the user to proper implement alignment. Examples of features that can utilize the wire frame helper include bucket, stick, boom, tracks, trench box and pipe. The wire frame guide can indicate depth of field to provide the user with depth perception while guiding a simulated component. The depth of field indicator can be separate from other indicators.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may be implemented as hardware circuitry, optical components, single or multi-processor circuits, memory circuits, software program modules and objects, firmware, and combinations thereof, as appropriate for particular implementations of various embodiments.

What is claimed is:

1. A heavy equipment simulation system for simulating an operation of a heavy equipment vehicle in a virtual environment, comprising:
   a support frame;
   an operator input control assembly coupled to the support frame for receiving input from a user, the operator input control assembly including:
   a heavy equipment vehicle control assembly for use in operating a simulated heavy equipment vehicle in the virtual environment, the heavy equipment vehicle control assembly configured to generate first input signals based on the user's interaction with the heavy equipment vehicle control assembly;
   a motion actuation system coupled to the support frame for adjusting an orientation of the support frame with respect to a ground surface;
   a display device assembly configured to display the virtual environment including the simulated heavy equipment vehicle, wherein the display device assembly includes a plurality of display monitors coupled to a support assembly, the support assembly configured to support the plurality of display monitors from the ground surface, the display device assembly being spaced a distance from the support frame to enable the user to view the virtual environment being displayed on the plurality of display monitors;
   a virtual reality (VR) headset unit adapted to be worn by the user, the VR headset unit including a VR head mounted display configured to display the virtual environment including the simulated heavy equipment vehicle, and position sensors configured to detect an orientation of the VR headset unit and generate second input signals based on the detected orientation of the VR headset unit; and
   a control system including a processor coupled to a memory device, the processor programmed to:
   generate the virtual environment including the simulated heavy equipment vehicle;
   operate the simulated heavy equipment vehicle within the virtual environment based on the first input signals received from the heavy equipment vehicle control assembly;
   operate the motion actuation system to adjust the orientation of the support frame with respect to the ground surface based on movements of the simulated heavy equipment vehicle within the virtual environment;
   render the virtual environment including the simulated heavy equipment vehicle on the VR head mounted display; and
   render the virtual environment including the simulated heavy equipment vehicle on the display device assembly.

2. A heavy equipment simulation system for simulating an operation of a heavy equipment vehicle in a virtual environment, comprising:
   a support frame;
   an operator input control assembly coupled to the support frame for receiving input from a user, the operator input control assembly including:
   a heavy equipment vehicle control assembly for use in operating a simulated heavy equipment vehicle in the virtual environment, the heavy equipment vehicle control assembly configured to generate first input signals based on the user's interaction with the heavy equipment vehicle control assembly;
   a motion actuation system coupled to the support frame for adjusting an orientation of the support frame with respect to a ground surface;
   a display device assembly configured to display the virtual environment including the simulated heavy equipment vehicle;
   a virtual reality (VR) headset unit adapted to be worn by the user, the VR headset unit including a VR head mounted display configured to display the virtual environment including the simulated heavy equipment vehicle, and position sensors configured to detect an orientation of the VR headset unit and generate second input signals based on the detected orientation of the VR headset unit; and
   a control system including a processor coupled to a memory device, the processor programmed to:
   generate the virtual environment including the simulated heavy equipment vehicle;
   operate the simulated heavy equipment vehicle within the virtual environment based on the first input signals received from the heavy equipment vehicle control assembly;
   operate the motion actuation system to adjust the orientation of the support frame with respect to the ground surface based on movements of the simulated heavy equipment vehicle within the virtual environment;
   render the virtual environment including the simulated heavy equipment vehicle on the VR head mounted display; and
   render the virtual environment including the simulated heavy equipment vehicle on the display device assembly, wherein the processor is programmed to operate in a VR display mode by:
   establishing a VR camera viewpoint location within a cab of the simulated heavy equipment vehicle within the virtual environment;
   rendering a VR camera viewpoint of the virtual environment on the VR head mounted display based on the VR camera viewpoint location;
   monitoring an orientation of the VR headset unit based on the second input signals received from the VR headset unit; and
   adjusting an orientation of the rendered VR camera viewpoint based on changes in the orientation of the VR headset unit.

3. The heavy equipment simulation system of claim 2, wherein the processor is further programmed to operate in the VR display mode by simultaneously rendering the VR camera viewpoint of the virtual environment on the display device assembly.

4. The heavy equipment simulation system of claim 3, wherein the VR headset unit includes an infrared sensor configured to detect a position of the user's hands, the processor is further programmed to operate in the VR display mode by rendering images of simulated user hands within the virtual environment based on the detected position of the user's hands.

5. The heavy equipment simulation system of claim 2, wherein the processor is programmed to operate in a non-VR display mode by:
    establishing a non-VR camera viewpoint location within the cab of the simulated heavy equipment vehicle within the virtual environment; and
    rendering a non-VR camera viewpoint of the virtual environment on the display device assembly based on the non-VR camera viewpoint location.

6. The heavy equipment simulation system of claim 5, wherein the non-VR camera viewpoint location is adjacent to the VR camera viewpoint location within the cab of the simulated heavy equipment vehicle.

7. The heavy equipment simulation system of claim 5, wherein the operator input control assembly includes a user input device configured to generate third input signals based on the user's interaction with the user input device for adjusting an orientation of a displayed viewpoint of the virtual environment; and
    wherein the processor is further programmed to operate in the non-VR display mode by adjusting an orientation of the rendered non-VR camera viewpoint based on the third input signals received from the user input device.

8. The heavy equipment simulation system of claim 5, wherein the processor is further programmed to not render the VR camera viewpoint on the VR head mounted display when operating in the non-VR camera mode.

9. The heavy equipment simulation system of claim 5, wherein the processor is programmed to operate in the VR mode or the non-VR mode based on the detected orientation of the VR headset unit.

10. The heavy equipment simulation system of claim 9, wherein the VR headset unit is adapted to be worn on a head of the user, the processor is further programmed to switch from operating in the VR mode to operating the non-VR mode upon detecting the VR headset unit being removed from the head of the user.

11. The heavy equipment simulation system of claim 10, wherein the processor is programmed to:
    initiate a training simulation using the simulated heavy equipment vehicle within the virtual environment upon receiving a user start-up input signal from the user via the heavy equipment vehicle control assembly; and
    initiate a camera switching mode by:
    determining whether the VR headset unit is being worn by the user; and
    rendering the training simulation in the VR mode upon determining the VR headset unit is being worn by the user by:
    enabling the VR camera viewpoint of the virtual environment;
    disabling the non-VR camera viewpoint; and
    simultaneously rendering the VR camera viewpoint on the VR head mounted display and the display device assembly; and
    render the training simulation in the non-VR mode upon determining the VR headset unit is not being worn by the user by:
    enabling the non-VR camera viewpoint of the virtual environment;
    disabling the VR camera viewpoint; and
    rendering the non-VR camera viewpoint on the display device assembly.

12. The heavy equipment simulation system of claim 8, wherein the processor is further programmed to:
    initially operate in the non-VR mode when initiating the training simulation;
    initiate a start-up sequence requiring the user to perform a sequence of control inputs using the heavy equipment vehicle control assembly; and
    switch operation from the non-VR mode to the VR mode upon determining completion of the start-up sequence by the user and determining the VR headset unit is being worn by the user.

13. A method of operating a heavy equipment simulation system, the heavy equipment simulation system including a support frame, a heavy equipment vehicle control assembly for use in operating a simulated heavy equipment vehicle in the virtual environment and configured to generate first input signals based on the user's interaction with the heavy equipment vehicle control assembly, a motion actuation system coupled to the support frame for adjusting an orientation of the support frame with respect to a ground surface, a display device assembly configured to display the virtual environment including the simulated heavy equipment vehicle, a VR headset unit adapted to be worn by the user and including a VR head mounted display and position sensors configured to detect an orientation of the VR headset unit and generate second input signals based on the detected orientation of the VR headset unit, and a control system including a processor coupled to a memory device, the method comprising the processor performing the steps of:
    generating the virtual environment including the simulated heavy equipment vehicle;
    operating the simulated heavy equipment vehicle within the virtual environment based on the first input signals received from the heavy equipment vehicle control assembly;
    operating the motion actuation system to adjust the orientation of the support frame with respect to the ground surface based on movements of the simulated heavy equipment vehicle within the virtual environment;
    rendering the virtual environment including the simulated heavy equipment vehicle on the VR head mounted display; and
    rendering the virtual environment including the simulated heavy equipment vehicle on the display device assembly, the processor performing the steps of operating in a VR display mode by:
    establishing a VR camera viewpoint location within a cab of the simulated heavy equipment vehicle within the virtual environment;
    rendering a VR camera viewpoint of the virtual environment on the VR head mounted display based on the VR camera viewpoint location;
    monitoring an orientation of the VR headset unit based on the second input signals received from the VR headset unit; and
    adjusting an orientation of the rendered VR camera viewpoint based on changes in the orientation of the VR headset unit.

14. The method of claim 13, including the processor performing the step of operating in the VR display mode by simultaneously rendering the VR camera viewpoint of the virtual environment on the display device assembly.

15. The method of claim 13, including the processor performing the step of operating in a non-VR display mode by:

establishing a non-VR camera viewpoint location within the cab of the simulated heavy equipment vehicle within the virtual environment;

rendering a non-VR camera viewpoint of the virtual environment on the display device assembly based on the non-VR camera viewpoint location; and disabling rendering on the VR head mounted display when operating in the non-VR camera mode.

16. The method of claim 15, including the processor performing the steps of:

initiating a training simulation using the simulated heavy equipment vehicle within the virtual environment upon receiving a user start-up input signal from the user via the heavy equipment vehicle control assembly; and initiating a camera switching mode by:

determining whether the VR headset unit is being worn by the user; and rendering the training simulation in the VR mode upon determining the VR headset unit is being worn by the user by:

enabling the VR camera viewpoint of the virtual environment;

disabling the non-VR camera viewpoint; and simultaneously rendering the VR camera viewpoint on the VR head mounted display and the display device assembly; and render the training simulation in the non-VR mode upon determining the VR headset unit is not being worn by the user by:

enabling the non-VR camera viewpoint of the virtual environment;

disabling the VR camera viewpoint; and rendering the non-VR camera viewpoint on the display device assembly.

17. The method of claim 16, including the processor performing the steps of:

initially operating in the non-VR mode when initiating the training simulation;

initiating a start-up sequence requiring the user to perform a sequence of control inputs using the heavy equipment vehicle control assembly; and switching operation from the non-VR mode to the VR mode upon determining completion of the start-up sequence by the user and determining the VR headset unit is being worn by the user.

18. One or more non-transitory computer-readable storage media, having computer-executable instructions embodied thereon, wherein when executed by at least one processor, the computer-executable instructions cause the at least one processor to:

generate a virtual environment including the simulated heavy equipment vehicle;

operate the simulated heavy equipment vehicle within the virtual environment based on the first input signals received from a heavy equipment vehicle control assembly;

operate a motion actuation system to adjust the orientation of a support frame with respect to a ground surface based on movements of the simulated heavy equipment vehicle within the virtual environment;

render the virtual environment including the simulated heavy equipment vehicle on a VR head mounted display; and render the virtual environment including the simulated heavy equipment vehicle on a display device assembly, the computer-executable instructions cause the at least one processor to operate in a VR display mode by:

establishing a VR camera viewpoint location within a cab of the simulated heavy equipment vehicle within the virtual environment;

rendering a VR camera viewpoint of the virtual environment on the VR head mounted display based on the VR camera viewpoint location;

monitoring an orientation of the VR headset unit based on the second input signals received from the VR headset unit; and adjusting an orientation of the rendered VR camera viewpoint based on changes in the orientation of the VR headset unit.

19. A method of operating a heavy equipment simulation system, the heavy equipment simulation system including a support frame, a heavy equipment vehicle control assembly for use in operating a simulated heavy equipment vehicle in the virtual environment and configured to generate first input signals based on the user's interaction with the heavy equipment vehicle control assembly, a motion actuation system coupled to the support frame for adjusting an orientation of the support frame with respect to a ground surface, a display device assembly configured to display the virtual environment including the simulated heavy equipment vehicle, wherein the display device assembly includes a plurality of display monitors coupled to a support assembly, the support assembly configured to support the plurality of display monitors from the ground surface, the display device assembly being spaced a distance from the support frame to enable the user to view the virtual environment being displayed on the plurality of display monitors, a VR headset unit adapted to be worn by the user and including a VR head mounted display and position sensors configured to detect an orientation of the VR headset unit and generate second input signals based on the detected orientation of the VR headset unit, and a control system including a processor coupled to a memory device, the method comprising the processor performing the steps of:

generating the virtual environment including the simulated heavy equipment vehicle;

operating the simulated heavy equipment vehicle within the virtual environment based on the first input signals received from the heavy equipment vehicle control assembly;

operating the motion actuation system to adjust the orientation of the support frame with respect to the ground surface based on movements of the simulated heavy equipment vehicle within the virtual environment;

rendering the virtual environment including the simulated heavy equipment vehicle on the VR head mounted display; and rendering the virtual environment including the simulated heavy equipment vehicle on the plurality of display monitors of the display device assembly.

20. One or more non-transitory computer-readable storage media, having computer-executable instructions embodied thereon, wherein when executed by at least one processor, the computer-executable instructions cause the at least one processor to:

generate a virtual environment including the simulated heavy equipment vehicle;

operate the simulated heavy equipment vehicle within the virtual environment based on the first input signals received from a heavy equipment vehicle control assembly;

operate a motion actuation system to adjust the orientation of a support frame with respect to a ground surface based on movements of the simulated heavy equipment vehicle within the virtual environment;

render the virtual environment including the simulated heavy equipment vehicle on a VR head mounted display; and render the virtual environment including the simulated heavy equipment vehicle on a display device assembly, wherein the display device assembly includes a plurality of display monitors coupled to a support assembly, the support assembly configured to support the plurality of display monitors from a ground surface, the display device assembly being spaced a distance from the support frame to enable the user to view the virtual environment being displayed on the plurality of display monitors.

* * * * *